US009393609B2

(12) United States Patent
Fowler

(10) Patent No.: US 9,393,609 B2
(45) Date of Patent: Jul. 19, 2016

(54) CAN BODY TAKE-AWAY MECHANISM FOR VERTICAL BODYMAKER

(71) Applicant: Stolle Machinery Company, LLC, Centennial, CO (US)

(72) Inventor: Tracy Jay Fowler, Lakewood, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 299 days.

(21) Appl. No.: 14/205,411

(22) Filed: Mar. 12, 2014

(65) Prior Publication Data

US 2014/0260497 A1  Sep. 18, 2014

Related U.S. Application Data

(60) Provisional application No. 61/777,254, filed on Mar. 12, 2013.

(51) Int. Cl.
| *B65G 47/24* | (2006.01) |
| *B21D 51/26* | (2006.01) |
| *B21D 22/28* | (2006.01) |
| *B23Q 7/03* | (2006.01) |
| *B65G 17/12* | (2006.01) |

(52) U.S. Cl.
CPC ............ *B21D 51/2692* (2013.01); *B21D 22/28* (2013.01); *B21D 51/26* (2013.01); *B23Q 7/035* (2013.01); *B65G 17/12* (2013.01)

(58) Field of Classification Search
CPC ..................... B65G 47/244; B65G 2201/0244; B65G 47/847; B65G 47/24; B65G 47/902; B65G 47/907

USPC .......... 198/867.1, 803.13, 468.8, 379, 476.1, 198/477.1
See application file for complete search history.

(56) References Cited

U.S. PATENT DOCUMENTS

| 3,109,535 | A |   | 11/1963 | Norwood |
| 4,179,909 | A |   | 12/1979 | Maeder |
| 4,640,406 | A | * | 2/1987 | Willison ................. B41F 17/14 198/377.03 |
| 4,928,511 | A |   | 5/1990 | Sirvet |
| 5,215,180 | A | * | 6/1993 | Allard .................. B65G 47/918 198/379 |

(Continued)

OTHER PUBLICATIONS

International Search Report, PCT/US2014/023857, Jul. 9, 2014, 3 pgs.

*Primary Examiner* — James R Bidwell
(74) *Attorney, Agent, or Firm* — Eckert Seamans Cherin & Mellott, LLC; David C. Jenkins

(57) ABSTRACT

A can body take-away assembly for a can bodymaker with a vertically oriented, reciprocating, elongated ram assembly and a domer is provided. The take-away assembly includes a drive assembly and a can body transport assembly. The drive assembly includes a motor and a support member. The take-away assembly motor is operatively coupled to the support member and structured to move the drive assembly support member in a generally horizontal direction. The can body transport assembly includes a number of gripping assemblies. Each gripping assembly is coupled to the drive assembly support member. Each gripping assembly includes a number of pairs of opposed gripping members sized to grip a can body. The gripping assemblies are structured to travel across the path of the ram assembly and to selectively grip a can body.

15 Claims, 15 Drawing Sheets

(56) References Cited

U.S. PATENT DOCUMENTS

| | | |
|---|---|---|
| 5,400,635 A | 3/1995 | Kawaguchi et al. |
| 5,431,038 A | 7/1995 | Cheers et al. |
| 5,566,567 A | 10/1996 | Main |
| 5,586,642 A | 12/1996 | Hawkins |
| 6,581,751 B1 * | 6/2003 | Nickey ................. B65G 47/847 198/379 |
| 2003/0159754 A1 | 8/2003 | Bausch |
| 2008/0271976 A1 | 11/2008 | Monti |
| 2012/0018280 A1 * | 1/2012 | Hamao ................. B65G 47/244 198/379 |
| 2013/0216334 A1 | 8/2013 | An et al. |

* cited by examiner

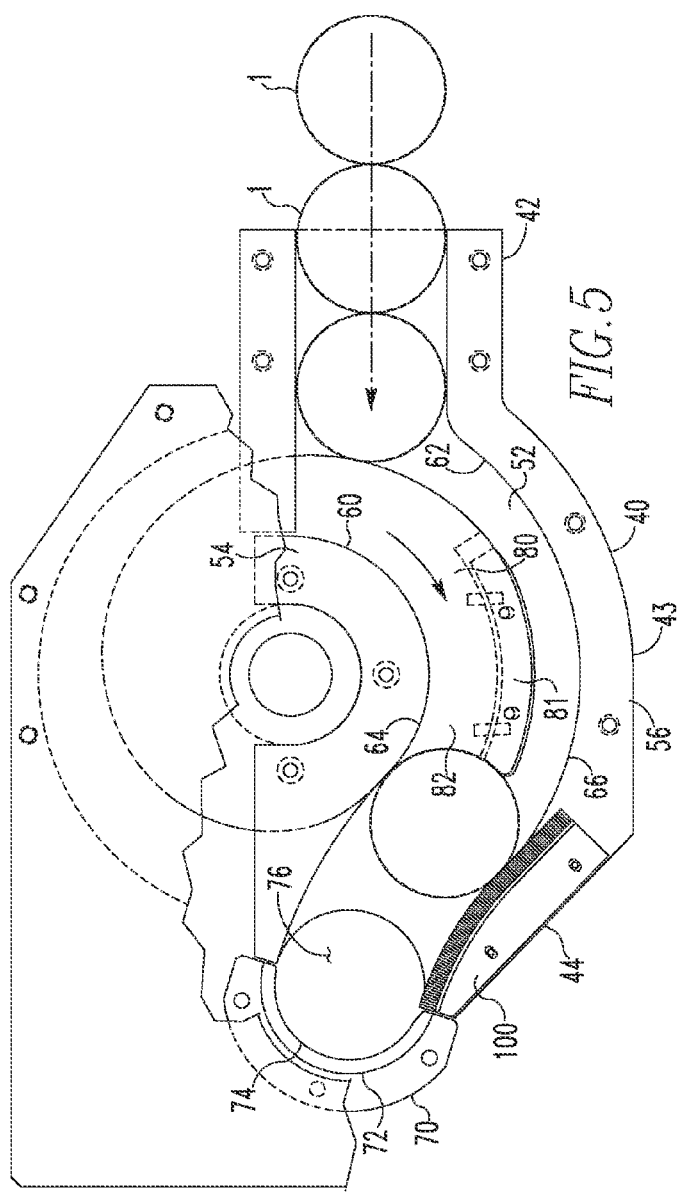

CAN BODY TAKE-AWAY MECHANISM FOR VERTICAL BODYMAKER

CROSS REFERENCE TO RELATED APPLICATION

This application claims priority to U.S. Provisional Patent Application Ser. No. 61/777,254, filed Mar. 12, 2013 entitled CAN BODY TAKEAWAY MECHANISM FOR VERTICAL BODYMAKER.

BACKGROUND OF THE INVENTION

1. Field of the Invention

The disclosed concept relates generally a can bodymaker and, more specifically, to a can body take-away mechanism for a bodymaker utilizing a vertically reciprocating ram.

2. Background Information

Generally, a can, such as but not limited to an aluminum can or steel can, begins as a sheet of metal from which a circular blank is cut. Hereinafter, the can will be described as being made from aluminum, but it is understood that the selection of material is not limiting upon the claims. The blank is formed into a "cup." As used herein, a "cup" includes a bottom and a depending sidewall. Further, while cups and the resulting can bodies may have any cross-sectional shape, the most common cross-sectional shape is generally circular. Accordingly, while it is understood that the cups and the resulting can bodies may have any cross-sectional shape, the following description shall describe the cups, can bodies, punches, etc. as being generally circular.

The cup is fed into a bodymaker including a reciprocating ram and a number of dies. The elongated ram includes a punch at the distal end. A cup is disposed on the punch and passed through the dies which thin and elongated the cup. That is, on each forward stroke of the ram, a cup is initially positioned in front of the ram. The cup is disposed over the forward end of the ram, and more specifically on the punch located at the front end of the ram. The cup is then passed through the dies which further form the cup into a can body. The first die is the redraw die. That is, a cup has a diameter that is greater than the resulting can. A redraw die reshapes the cup so that the cup has a diameter generally the same as the resulting can body. The redraw die does not effectively thin the thickness of the cup sidewall. After passing through the redraw die, the ram moves through a tool pack having a number of ironing dies. As the cup passes through the ironing dies, the cup is elongated and the sidewall is thinned. More specifically, the die pack has multiple, spaced dies, each die having a substantially circular opening. Each die opening is slightly smaller than the next adjacent upstream die.

Thus, when the punch draws the cup through the first die, the redraw die, the aluminum cup is deformed over the substantially cylindrical punch. As the cup moves through the redraw die, the diameter of the cup, i.e., the diameter of the bottom of the cup, is reduced. Because the openings in the subsequent dies in the die pack each have a smaller inner diameter, i.e., a smaller opening, the aluminum cup, and more specifically the sidewall of the cup, is thinned as the ram moves the aluminum through the rest of the die pack. The thinning of the cup also elongates the cup.

Further, the distal end of the punch is concave. At the maximum extension of the ram is a "domer." The domer has a generally convex dome and a shaped perimeter. As the ram reaches its maximum extension, the bottom of the cup engages the domer. The bottom of the cup is deformed into a dome and the bottom perimeter of the cup is shaped as desired; typically angled inwardly so as to increase the strength of the can body and to allow for the resulting cans to be stacked. After the cup passes through the final ironing die and contacts the domer, it is a can body.

On the return stroke, the can body is removed from the punch. That is, as the ram moves backwardly through the tool pack, the can body contacts a stationary stripper which prevents the can body from being pulled backward into the tool pack and in effect removes the can body from the punch. In addition to the stripper, a short blast of air may be introduced through the inside of the punch to aid in can body removal. After the ram moves back to an initial position, a new cup is positioned in front of the ram and the cycle repeats. Following additional finishing operations, e.g., trimming, washing, printing, etc., the can body is sent to a filler which fills the can body with product. A top is then coupled to, and sealed against, the can body, thereby completing the can.

The ram and the die pack are typically oriented generally horizontally. That is, the longitudinal axis of the ram and the axis of the tool pack extends generally horizontally. In this orientation certain components of the bodymaker may be of a relatively simple construction. For example, a cup feeder, i.e., the device that positions cups in the path of ram travel, may rely, in part, on gravity to position a cup on a cup locator for further processing. Throughout this process the cup in the conventional cup feed mechanism is oriented with its axis in a horizontal plane. It is constrained on the sides by guide rails and on both ends by guide plates. When the cup is resting in the cup locator there is an opening present in the open end guide plate to facilitate insertion of the redraw sleeve (a sleeve that clamps the cup against the redraw die and which is hollow to allow the ram to pass therethrough).

Similarly, with a ram traveling in a horizontal direction, the can body take-away device may rely upon gravity to deposit the can bodies on a conveyor. The conveyor consists of a continuously moving chain having a series of rubber "L" shaped attachments. This chain conveyor moves in an upward incline in order to ensure the cans rest in the "L" shaped attachments. The constantly moving conveyor chain is timed such that the fingers of the attachments meet the can at the point it is stripped from the punch and is free to be removed from the bodymaker.

A ram traveling in a horizontal direction, however, has disadvantages. For example, the ram body is a cantilevered body, being coupled at one end to a drive mechanism. In this configuration, the weight of the ram body causes the ram body to droop. This droop may cause a mis-alignment between the ram and the tool pack. This mis-alignment may change over the course of a day, e.g., the ram body may heat up due to use thereby changing the characteristics of the ram which, in turn, change the alignment of the ram. Thus, there is not a simple solution such as repositioning the dies in the tool pack. The ram droop further causes quality problems in the forming of cans by making it difficult to maintain even wall thicknesses. The ram droop also may cause problems when the ram retracts. More specifically, the back side of the punch may contact the ironing dies resulting in abnormal wear to the dies. The ram droop can be mitigated to some degree by making the ram larger in diameter and making the assembly lighter but the tendency to droop will still be evident and using a larger diameter ram would not work when making a small diameter can. Further problems with a conventional bodymaker with the horizontal layout is that it has a relatively large footprint and all bodymakers made to date can only produce one can per cycle per machine. That is, for each revolution of the ram drive mechanism, a single can body is produced. This requires a plant operator to have a large number of machines to meet desired production quotas. Some of these disadvantages may be addressed by utilizing a ram that travels over a generally vertical path.

There is, therefore, a need for a can body take-away mechanism structured to operate with a bodymaker wherein the ram travels vertically. There is a further need for a can body take-away mechanism that reorients a vertically oriented can body to a horizontal orientation so that the can body may be further processed by existing machines.

SUMMARY OF THE INVENTION

These needs, and others, are addressed by the disclosed and claimed device which provides a can body take-away assembly for a can bodymaker with a vertically oriented, reciprocating, elongated ram assembly and a domer. The take-away assembly includes a drive assembly and a can body transport assembly. The drive assembly includes a motor and a support member. The take-away assembly motor is operatively coupled to the support member and structured to move the drive assembly support member in a generally horizontal direction. The can body transport assembly includes a number of gripping assemblies. Each gripping assembly is coupled to the drive assembly support member. Each gripping assembly includes a number of pairs of opposed gripping members sized to grip a can. The gripping assemblies are structured to travel across the path of the ram assembly and to selectively grip a can body.

BRIEF DESCRIPTION OF THE DRAWINGS

A full understanding of the disclosed concept can be gained from the following description of the preferred embodiments when read in conjunction with the accompanying drawings in which:

FIG. 4 is a detail side cross-sectional view of a cup feeder assembly.

FIG. 5 is a top view of a cup feeder in a first position.

DESCRIPTION OF THE PREFERRED EMBODIMENTS

Figure 1:
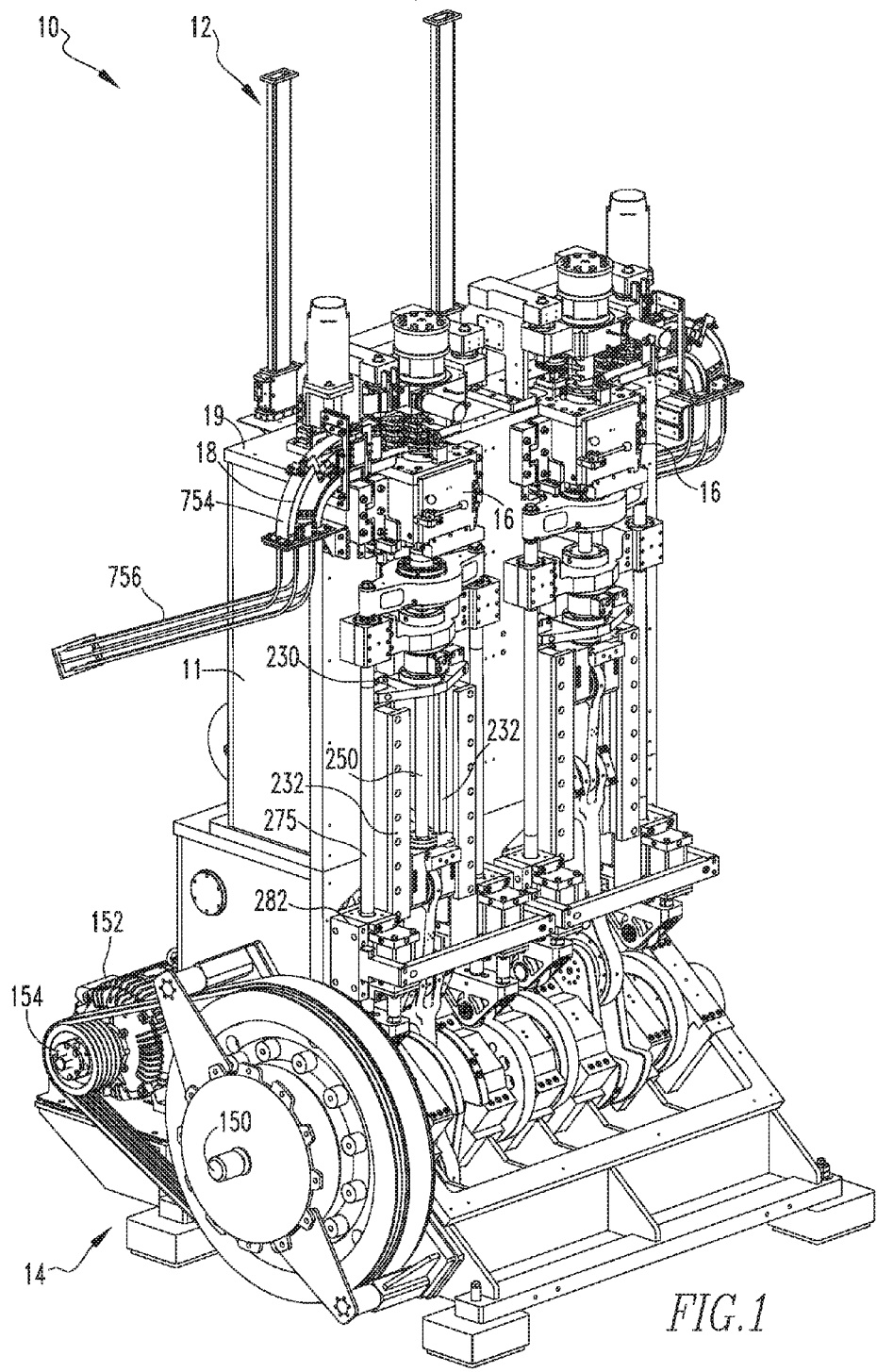
FIG. 1 is an isometric front view of a bodymaker.

As used herein, the singular form of "a," "an," and "the" include plural references unless the context clearly dictates otherwise. As used herein, the term "number," or "a number," shall mean one or an integer greater than one (i.e., a plurality).

As used herein, "coupled" means a link between two or more elements, whether direct or indirect, so long as a link occurs. An object resting on another object held in place only by gravity is not "coupled" to the lower object unless the upper object is otherwise maintained substantially in place. That is, for example, a book on a table is not coupled thereto, but a book glued to a table is coupled thereto.

As used herein, "directly coupled" means that two elements are directly in contact with each other.

As used herein, "fixedly coupled" or "fixed" means that two components are coupled so as to move as one while maintaining a constant orientation relative to each other. Similarly, two or more elements disposed in a "fixed relationship" means that two components maintain a substantially constant orientation relative to each other.

As used herein, the word "unitary" means a component is created as a single piece or unit. That is, a component that includes pieces that are created separately and then coupled together as a unit is not a "unitary" component or body.

As used herein, "associated" means that the identified components are related to each other, contact each other, and/or interact with each other. For example, an automobile has four tires and four hubs, each hub is "associated" with a specific tire.

As used herein, "engage," when used in reference to gears or other components having teeth, means that the teeth of the gears interface with each other and the rotation of one gear causes the other gear or other component to rotate/move as well. As used herein, "engage," when used in reference to components not having teeth means that the components are biased against each other.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As used herein, "correspond" indicates that two structural components are similar in size, shape or function. With reference to one component being inserted into another component or into an opening in the other component, "corresponding" means components are sized to engage or contact each other with a minimum amount of friction. Thus, an opening which corresponds to a member is sized slightly larger than the member so that the member can pass through the opening with a minimum amount of friction. This definition is modified if the two components are said to fit "snugly" together. In that situation, the difference between the size of the components is even smaller whereby the amount of friction increases. If one or more components are resilient, a "snugly corresponding" shape may include one component, e.g., the component defining the opening being smaller than the component inserted therein. Further, as used herein, "loosely correspond" means that a slot or opening is sized to be larger than an element disposed therein. This means that the increased size of the slot or opening is intentional and is more than a manufacturing tolerance.

As used herein, "at" means on or near.

Figure 2:
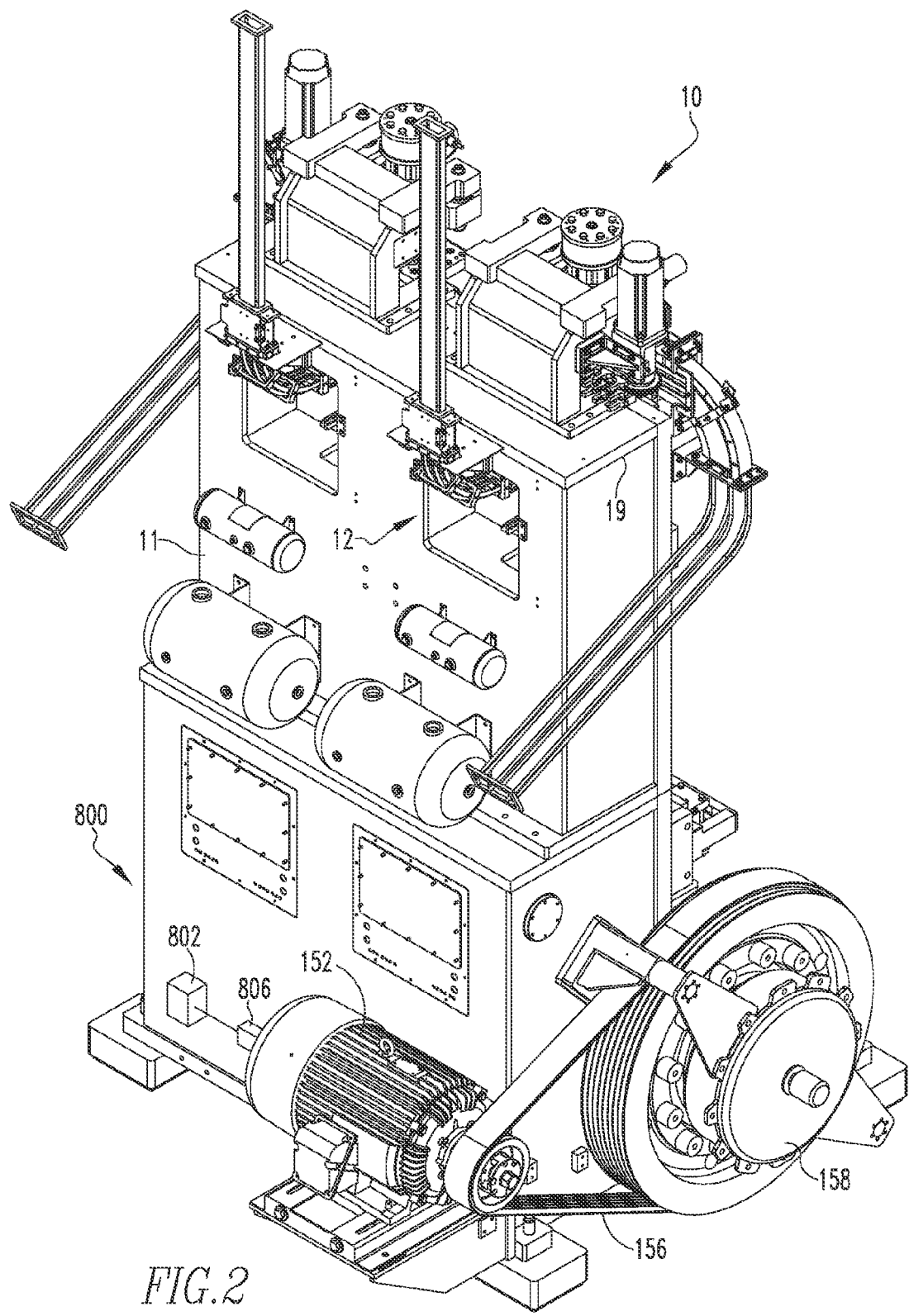
FIG. 2 is an isometric rear view of a bodymaker.
Figure 3:
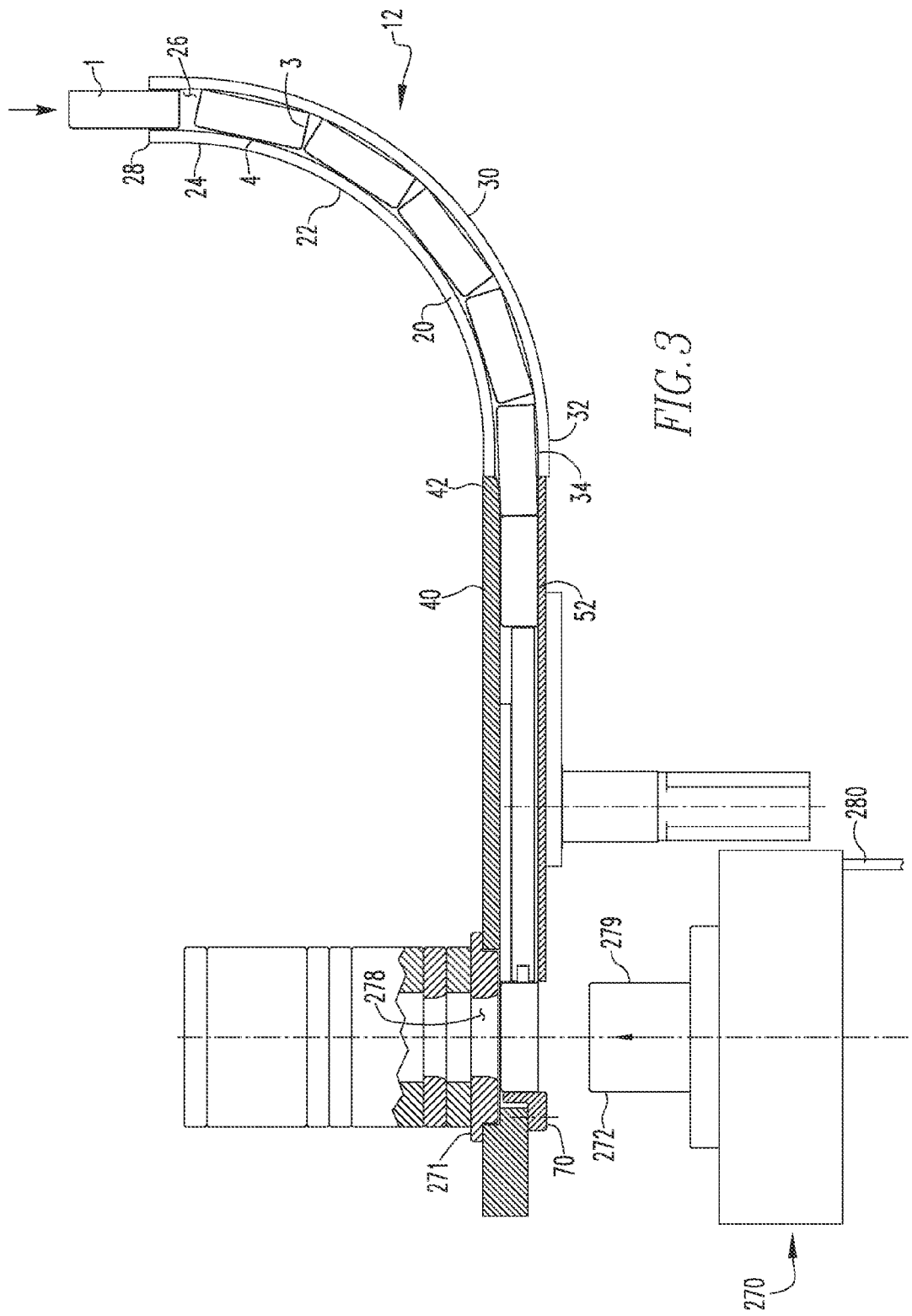
FIG. 3 is a side cross-sectional view of a cup feeder assembly.
Figure 16:
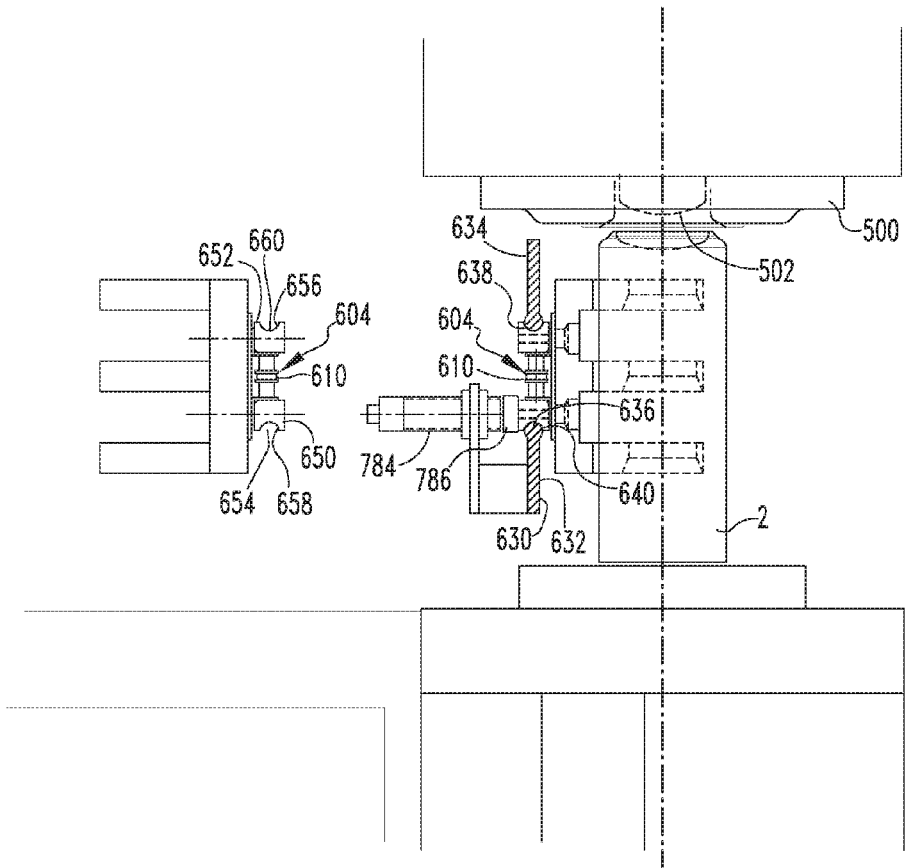
FIG. 16 is a detail cross-sectional side view of a can body take-away assembly.
Figure 17:
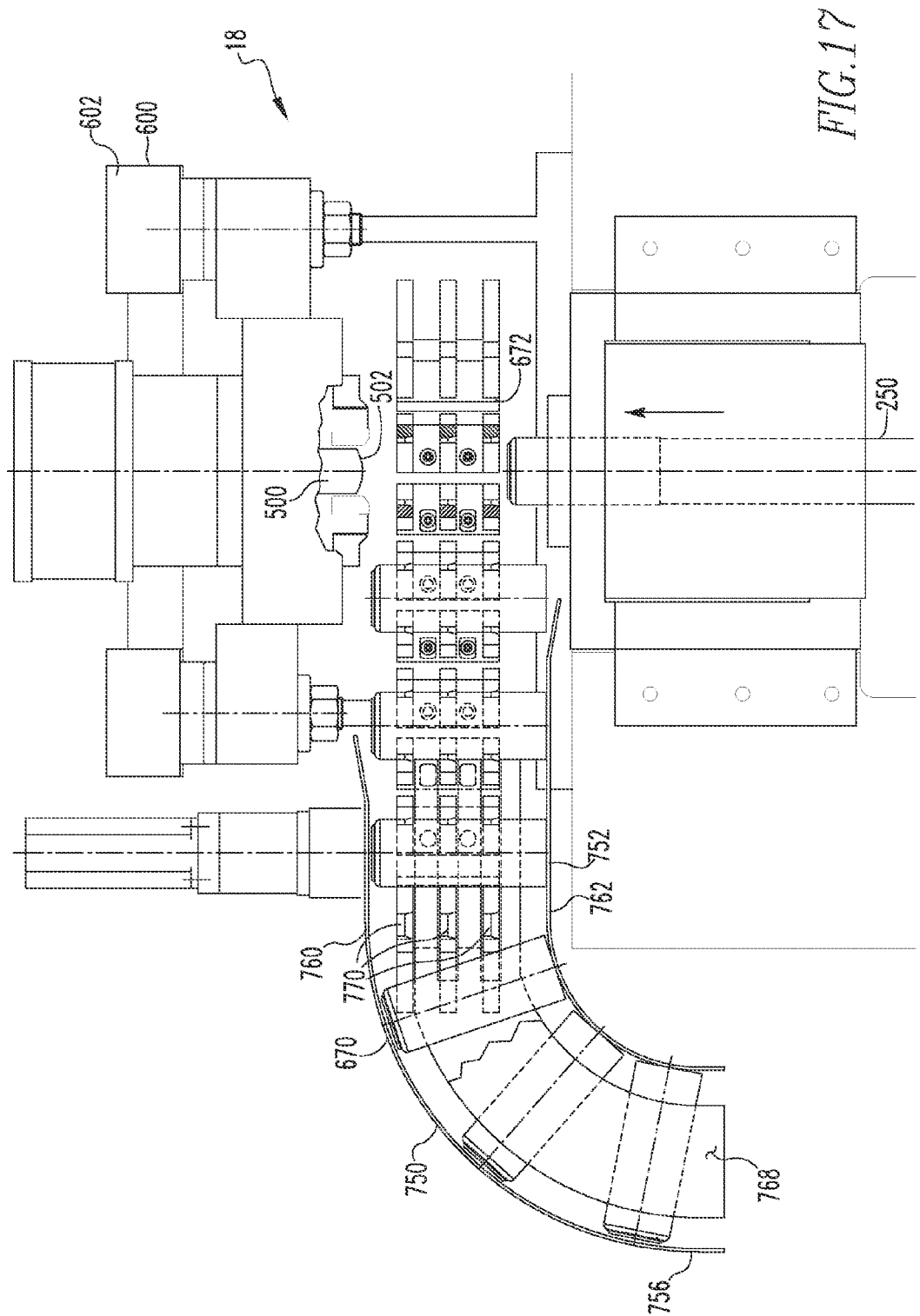
FIG. 17 is a front view of a can body take-away assembly with the ram in a different position.

A vertical bodymaker 10, shown in FIGS. 1 and 2, is structured to convert a cup 1 (FIG. 3) into a can body 2 (FIG. 16). A cup 1 includes a generally planar bottom 3 and a depending sidewall 4, as shown in FIG. 3. The vertical bodymaker 10, i.e., a bodymaker wherein a number of rams travel in generally vertical orientation, includes a housing assembly 11, a number of cup feed assemblies 12 (shown best in FIG. 2), an operating mechanism 14, a number of vertical tool packs 16, i.e., a tool pack wherein the axis of the circular dies extends generally vertically, and a number of take-away assemblies 18. As will be described below, the vertical bodymaker 10 may include at least two rams 250 and is able to process two cups 1 per cycle. As such, as shown, the vertical bodymaker 10 includes at least two of such components as the cup feed assembly 12, the vertical tool pack 16, and the take-away assembly 18. Unless otherwise noted, the following description shall describe one of each component. It is understood, however, that the components include substantially similar elements and the description of one component is applicable to any similar component. It is, noted that some components are mirror images of each other, e.g., one take-away assembly 18 ejects the can bodies 2 to the left side of vertical bodymaker 10 and the other take-away assembly 18 ejects the can bodies 2 to the right side of vertical bodymaker 10.

Generally, the housing assembly 11, which as used herein includes a frame assembly (not shown), supports the operating mechanism 14 with a number of rams 250 extending in, and reciprocation in, a generally vertical direction. That is, the housing assembly 11 includes a number of ram paths 13 (FIG. 9), i.e., a path of travel for a ram 250 and alternatively identified as a "ram 250 path of travel 13." There is one ram path 13 for each ram 250. In an exemplary embodiment, the cup feed assemblies 12, the vertical tool packs 16, and the take-away assemblies 18 are coupled to a housing assembly upper end 19, i.e., generally above the operating mechanism 14 and rams 250. In another embodiment, not shown, the positions of the components are generally reversed, i.e., the cup feed assemblies 12, the vertical tool packs 16, and the take-away assemblies 18 are coupled to the lower end of the housing assembly 11. The cup feed assembly 12 is provided with a number of cups 1 which are individually fed to the vertical tool packs 16. A ram 250 picks up the cup 1 and moves the cup through the vertical tool pack 16 to form a can body 2. At the top of the ram's 250 stroke, the can body 2 is ejected from the ram 250 and collected by a take-away assembly 18. The take-away assembly 18 moves the can body 2 away from the ram 250 and reorients the can body 2 to a horizontal orientation so that the can body 2 may be transported by traditional conveyors or other conveyors (not shown).

As shown in FIGS. 3-8, the cup feed assembly 12 includes a chute assembly 20, a cup locator 70 (FIGS. 5-8), and a rotatable feeder disk assembly 80 (FIGS. 5-8). In another embodiment, not shown, the cup feed assembly 12 further includes a cup stop (not shown). A cup stop is a pneumatically controlled device that starts and stops the flow of the cups 1 into the cup feed assembly 12 when there are interruptions in upstream or downstream processes. The chute assembly 20 includes a feeder chute 22 and a transfer chute 40. The feeder chute 22 has a hollow body 24 defining an enclosed space 26. The enclosed space 26 has a cross-sectional area corresponding to a cup 1. That is, the enclosed space 26 cross-sectional area is slightly larger than a cup 1 so that a cup 1 may move freely therethrough. The feeder chute 22 includes an inlet end 28, a medial portion 30 and an outlet end 32 (FIG. 3.) The feeder chute inlet end 28 extends generally vertically. The feeder chute medial portion 30 is arcuate and bends about ninety degrees so that feeder chute outlet end 32 extends generally horizontally. In this configuration, cups 1 may be introduced into the feeder chute inlet end 28 and fall, due to gravity, toward feeder chute outlet end 32. The weight of cups 1 in the feeder chute inlet end 28 will further bias the cups 1 in the feeder chute medial portion 30 and feeder chute outlet end 32 toward the transfer chute 40, described below. The feeder chute outlet end 32 includes a support surface 34. The feeder chute outlet end support surface 34 extends generally horizontally. The cups 1 are oriented in the feeder chute 22 so that, when the cups 1 are in the feeder chute outlet end 32, the cup bottom 3 is disposed above the depending sidewall 4. That is, the cup 1 is inverted and opens downwardly.

The feeder chute 22 is coupled to a transfer chute 40. More specifically, the transfer chute 40 includes a first end 42, a medial portion 43, and a second end 44. The transfer chute 40 is generally arcuate and extends generally horizontally. The transfer chute first end 42 is in communication with feeder chute outlet end 32. That is, as used herein, two or more chutes "in communication" with each other means than an object in one chute may pass into another chute. In one embodiment, shown in FIGS. 3 and 4, the transfer chute 40 includes an upper member 50, a lower member 52, an inner first side member 54 (FIGS. 5-8), and an outer second side member 56 (FIGS. 5-8). The transfer chute lower member 52 is generally planar and extends horizontally. The transfer chute lower member 52 may include slots or other openings (not shown) that are generally smaller than the cups 1. The transfer chute first side member 54 includes a slot 58 structured to allow feeder disk 81, discussed below, to pass therethrough. The transfer chute first and second side members 54, 56 define generally vertical guide surfaces 60, 62. That is, in an exemplary embodiment, transfer chute first and second side members 54, 56 are an inner guide rail 64 and an outer guide rail 66. The inner guide rail 64 and outer guide rail 66 are spaced slightly larger than the diameter of a cup 1.

As shown best in FIGS. 5-8, the transfer chute first end 42 and transfer chute medial portion 43 are defined by the transfer chute first and second side members 54, 56 and transfer chute lower member 52. The transfer chute first end 42 and transfer chute medial portion 43 are generally arcuate and have about the same center as the feeder disk 81. Transfer chute second end 44 is also, in one embodiment, arcuate, but curves away from the center of the feeder disk 81. The cup locator 70 is disposed at the transfer chute second end 44. The cup locator 70 is an arcuate member 72 having a diameter corresponding, and in one embodiment snuggly corresponding, to the diameter of a cup 1. That is, cup locator 70 defines a substantially vertical arcuate surface 74. Thus, the cup locator 70 further defines a holding space 76. The holding space 76 is in communication with the transfer chute second end 44. While there may be a gap, there is a generally smooth transition between inner guide rail 64 and cup locator 70. That is, the generally vertical surfaces defining the inner guide rail 64 and the inner side of cup locator 70 are generally aligned.

Before discussing other features of the transfer chute second end 44 it is noted that the ram 250 passes generally vertically through cup locator 70 and transfer chute second end 44. Thus, cup locator 70 and transfer chute second end 44 do not have a horizontal surfaces extending over the ram 250 path of travel 13. That is, the transfer chute upper member 50 and a lower member 52 do not extend over the locator 70 and transfer chute second end 44. Put another way, at the ram 250 path of travel 13, the transfer chute second end 44 is defined only by generally vertical guide surfaces. In reference to inner guide rail 64 and outer guide rail 66, the inner guide rail 64 and the outer guide rail 66 do not have a horizontal member therebetween at the transfer chute second end 44. In reference to the transfer chute second end 44, the phrase "horizontal member" is not limited to planar horizontal members and includes arcuate members having a horizontal portion.

Because the transfer chute second end 44 does not include horizontal surfaces at the ram 250 path of travel 13, another construct is used to support the cups 1 when the cups are disposed in the transfer chute second end 44 and cup locator 70. This construct includes a number of biasing devices 100, 102. Before describing biasing devices 100, 102, the rotatable feeder disk assembly 80 will be described.

Rotatable feeder disk assembly 80 includes a motor (not shown) and a feeder disk 81. Feeder disk 81 includes a disk body 82. The feeder disk assembly motor, in one embodiment, is a constant speed motor. In another embodiment, the feeder disk assembly motor is a variable speed servo-motor. The feeder disk assembly motor has a rotating output shaft (not shown) that is coupled to the disk body 82 and structured to rotate the feeder disk body 82. The feeder disk body 82 is rotatably coupled to the housing assembly 11. The feeder disk body 82 includes a circumferential surface 84. The circumferential surface 84 includes a first portion 86, a second portion 88, and a third portion 90. The circumferential surface first portion 86 has a generally constant radius. In one embodiment, the circumferential surface first portion 86 defines a cutout 92 (FIG. 8) having a reduced radius. As discussed below, an arcuate guide rail 120 is disposed in the first portion cutout 92 thereby providing a generally constant radius. The circumferential surface second portion 88 has a reducing radius and, in an exemplary embodiment, a constant spiral radius, i.e., reducing at a constant rate. The circumferential surface third portion 90 is a pocket 94. The pocket 94 defines a generally arcuate surface 96 that increases the radius of the disk body 82 from the minimum circumferential surface second portion 88 radius to the circumferential surface first portion 86 radius. The curvature of the pocket arcuate surface 96 generally corresponds to the curvature of a cup 1.

The feeder disk body 82 is rotatably coupled to the housing assembly 11 adjacent to the transfer chute first side member slot 58 and positioned so that, as the feeder disk body 82 rotates, the feeder disk body 82 extends partially into the transfer chute 40 via transfer chute first side member slot 58. The feeder disk body 82 rotates in a generally horizontal plane. The feeder disk body pocket 94 faces forward as the feeder disk body 82 rotates. As set forth immediately below, the feeder disk body 82 is structured to move a cup 1 from the transfer chute first end 42, over the transfer chute medial portion 43, and into the transfer chute second end 44 and cup locator 70.

That is, as noted above, gravity, and the weight of cups 1 in the feeder chute inlet end 28 bias the cups 1 in the feeder chute medial portion 30 and feeder chute outlet end 32 toward the transfer chute 40. As the feeder disk body pocket 94 rotates past transfer chute first end 42, a cup 1 is disposed in the feeder disk body pocket 94 and moved over the transfer chute medial portion 43. At this time, the cup 1 behind the cup 1 (hereinafter "the second cup") in the feeder disk body pocket 94 is biased, initially, against the circumferential surface first portion 86. As the circumferential surface first portion 86 is a generally constant radius, the second cup does not move forward into the transfer chute 40. As feeder disk body 82 continues to rotate, the second cup is biased against circumferential surface second portion 88. As the circumferential surface second portion 88 has a reducing radius, the second cup is moved into the transfer chute 40. When the feeder disk body pocket 94 again rotates to the transfer chute first end 42, the second cup 1 will be in a position to be moved by the feeder disk body pocket 94.

Figure 6:
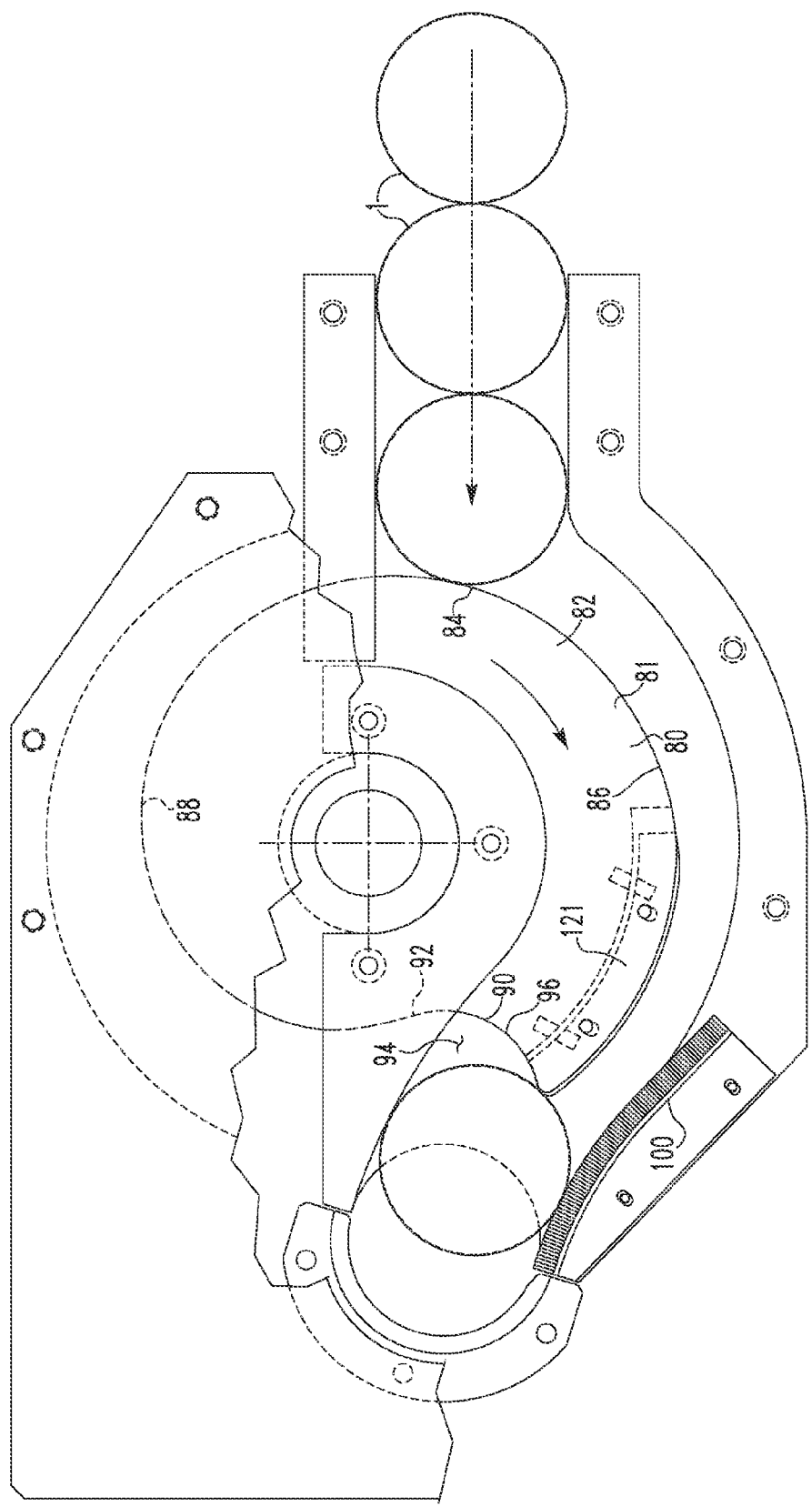
FIG. 6 is a top view of a cup feeder in a second position.
Figure 7:
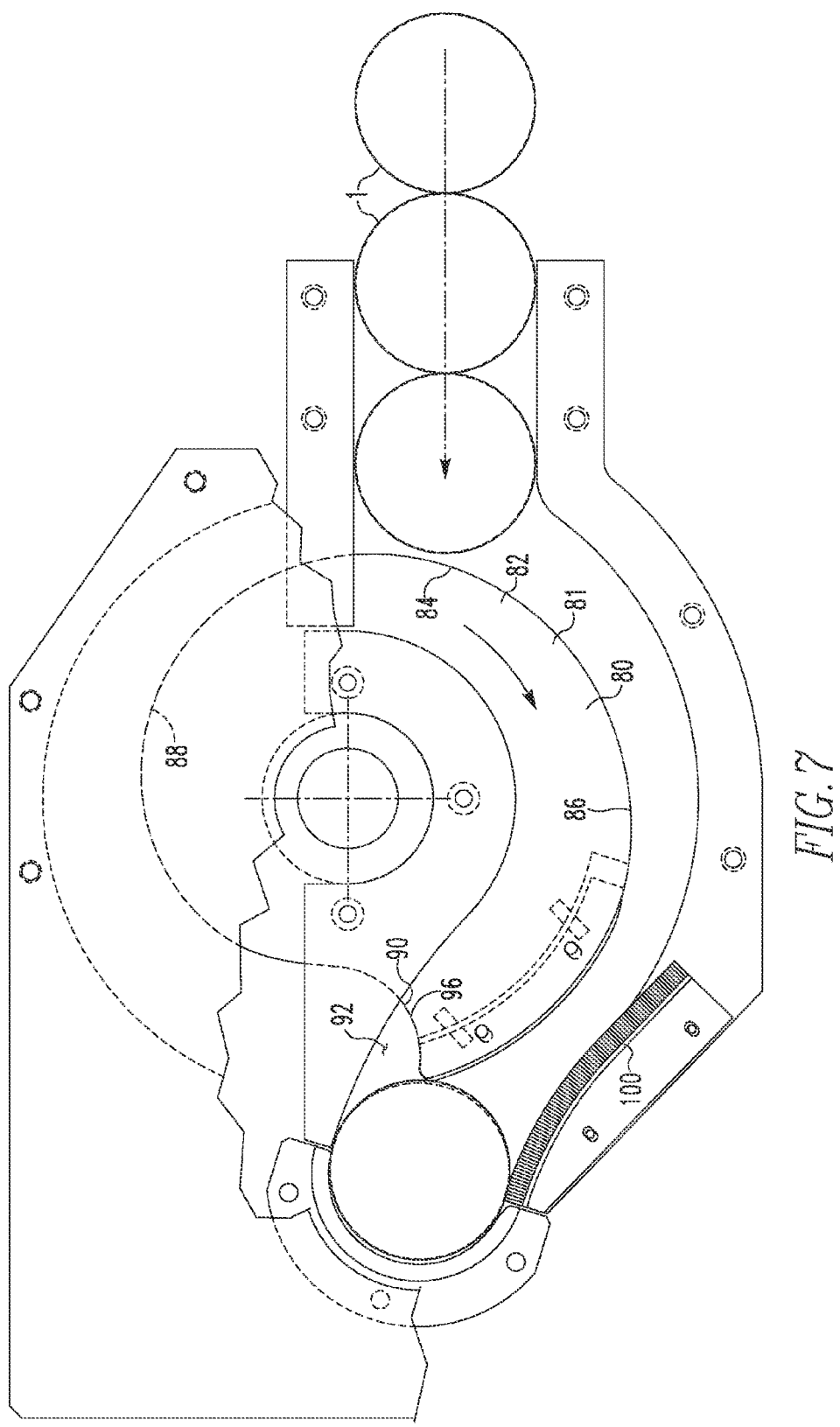
FIG. 7 is a top view of a cup feeder in a third position.

The cup 1 in the feeder disk body pocket 94 is moved over the transfer chute medial portion 43, generally moving in an arcuate path about the center of feeder disk body 82. As noted above, the transfer chute second end 44 curves away from the center of the feeder disk body 82. Thus, as the cup is moved into the transfer chute second end 44, the curvature of the transfer chute second end 44 causes the cup 1 to be moved out of the feeder disk body pocket 94. As shown in FIG. 6, the tip of the feeder disk body pocket 94 maintains contact with the cup 1 as the cup 1 moves over the upstream portion of transfer chute second end 44. That is, the "nose" of the feeder disk body pocket 94 pushes the cup 1 through the upstream portion of transfer chute second end 44. It is noted that, unlike a vertically oriented cup feeder which relied upon gravity to move a cup through a transfer chute, in this embodiment, the exclusive force moving the cup 1 through the transfer chute 40 is the force provided by the rotatable feeder disk assembly 80. That is, as used herein, the phrase "the exclusive force moving the cup through the transfer chute is the force provided by the rotatable feeder disk assembly," means that gravity is not a force acting on a cup so as to move the cup through a transfer chute.

As shown in FIGS. 5-8, as the cup 1 is moved fully into the transfer chute second end 44 and cup locator 70, the nose of feeder disk body pocket 94 moves past cup 1 leaving circumferential surface first portion 86 in contact with the cup 1. Thus, when the cup 1 is disposed at the transfer chute second end 44 and cup locator 70, the cup 1 is contacted by circumferential surface first portion 86 and the transfer chute second end 44. As noted above, the transfer chute second end 44 and cup locator 70 do not include a horizontal surface at the ram 250 path of travel. Thus, the cup 1 is supported by the biasing devices 100, 102, which are disposed at circumferential surface first portion 86 and the transfer chute second end 44.

A first biasing device 100 is disposed at transfer chute second end 44 and, in one embodiment at the outer guide rail 66 at transfer chute second end 44. The first biasing device 100 includes a number of resilient members 104. The resilient members 104 extend into transfer chute second end 44. More specifically, in one exemplary embodiment, resilient members 104 are elongated members having a proximal end 108 and a distal end 110. The resilient member proximal ends 108 are disposed adjacent to, and coupled to, the outer guide rail 66. The resilient member distal ends 110 extend into the transfer chute second end 44 and define a generally vertical surface 111. The resilient member vertical surface 111 extends substantially parallel to the inner guide rail 64. The resilient members 104 may be part of a brush assembly 112. That is, first biasing device 100 may be a brush assembly 112 including a number of bristles 114. In this configuration, the first biasing device 100 is structured to maintain a cup 1 in the holding space 76.

In operation, and as shown in FIGS. 5-8, the first biasing device 100 biases a cup 1 against the opposing guide rail, the inner guide rail 64 as shown. That is, as the nose of the feeder disk body pocket 94 pushes the cup 1 through the upstream portion of transfer chute second end 44 and moves the cup 1 over the portion of transfer chute 40 lacking a horizontal surface, the bias of the first biasing device 100 maintains the cup 1 in a generally horizontal orientation within transfer chute 40.

Figure 8:
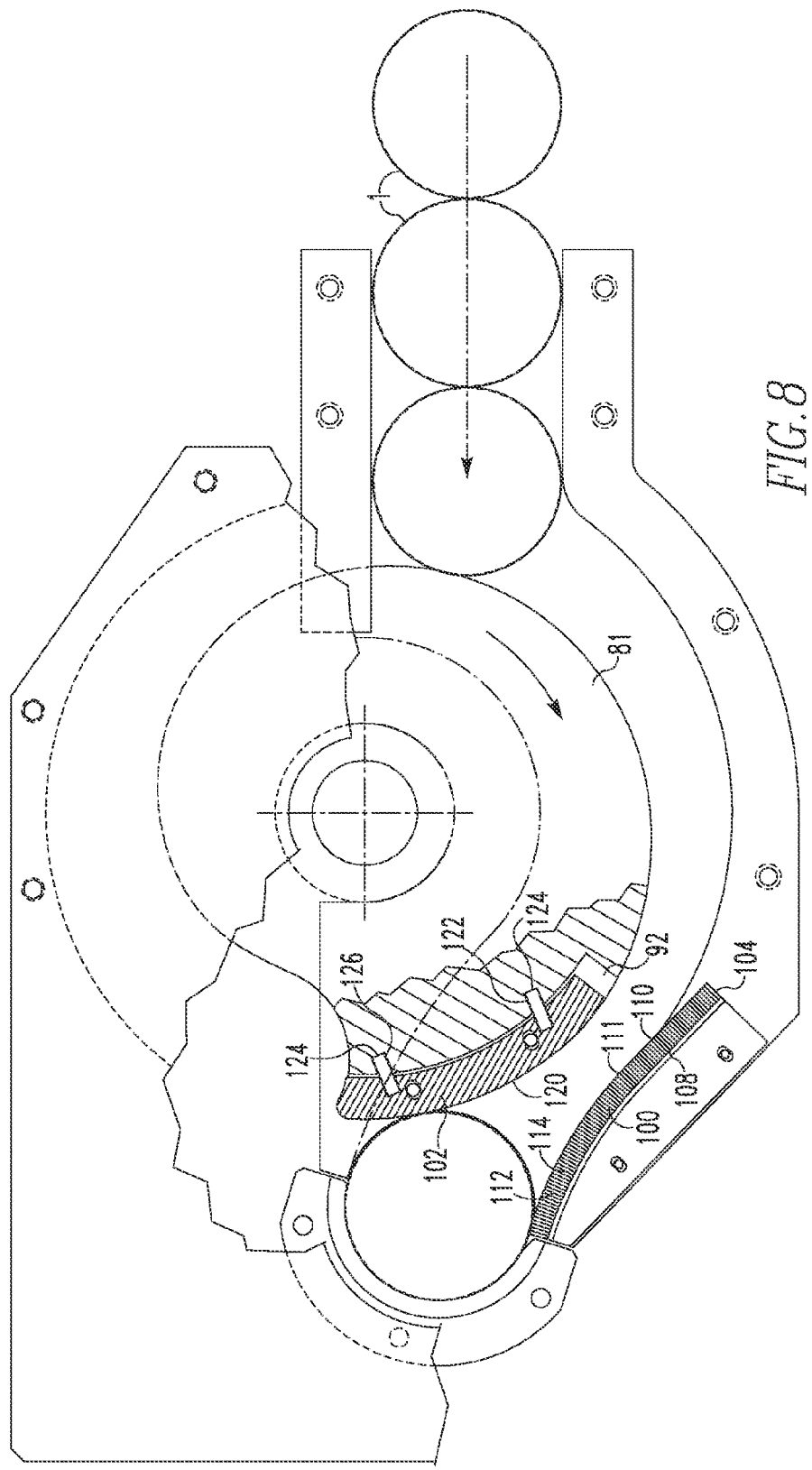
FIG. 8 is a top, partial cross-sectional view of a cup feeder in a fourth position.

The second biasing device 102 is disposed on feeder disk body 82. In one embodiment, the second biasing device 102 includes an arcuate guide rail 120 that is disposed in the first portion cutout 92. The arcuate guide rail 120 has an outer radius that is substantially similar to the radius of the circumferential surface first portion 86. The arcuate guide rail 120 is movably coupled to the feeder disk body 82 by biasing member 122, as shown, springs 124. The springs 124 have a longitudinal axis and, in an exemplary embodiment, the longitudinal axes of the springs 124 are generally parallel. The biasing member 122 biases the arcuate guide rail 120 outwardly. The range of motion of the arcuate guide rail 120 may be limited by a slot and pin coupling 126. That is, pins extending from feeder disk body 82 pass through generally radial slots in the arcuate guide rail 120 as shown in FIG. 8. In another embodiment, the arcuate guide rail 120 is a resilient body 121 or includes a resilient outer surface. In this embodiment, the resilient body is the biasing member 122.

In this configuration, and as shown in FIG. 8, the arcuate guide rail 120 is biased generally radially outwardly. Thus, when the cup 1 is moving into, and when the cup 1 is disposed in, the transfer chute second end 44 and cup locator 70, the second biasing device 102 biases the cup 1 toward the cup locator 70. Thus, a cup 1 in a horizontal orientation is maintained in the cup locator 70 even though the cup locator 70, as well as the transfer chute second end 44, does not include a horizontal surface at the ram 250 path of travel 13 to support the cup 1. Further, and as described below, the cup locator 70, as well as the transfer chute second end 44, are disposed below and adjacent to the redraw mechanism 270. A cup 1 in this position may be picked up by a ram body 252 (described below), and passed though the tool pack 16.

Figure 9:
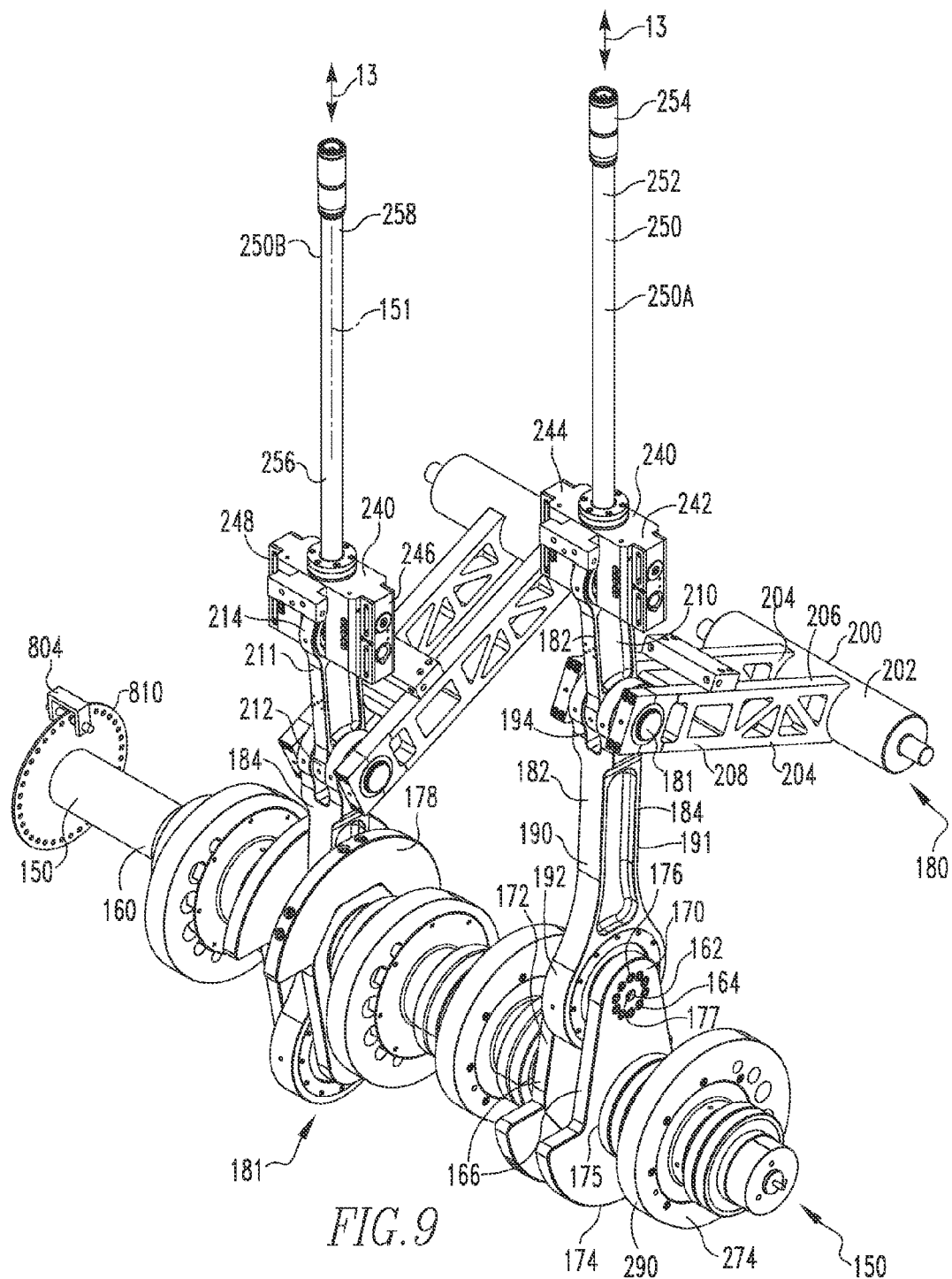
FIG. 9 is a detail isometric view of a crankshaft, link assembly and ram assembly.

As shown in FIGS. 1 and 9, the operating mechanism 14 includes a crankshaft 150, an operating mechanism motor 152 (FIG. 2), a link assembly 180 and a ram assembly 250. Generally, the crankshaft 150 movably supports a number of ram assemblies 250 (also referred to as "rams 250"). The crankshaft 150 causes the ram assemblies 250 to reciprocate along a generally vertical ram path 13. In an exemplary embodiment, the ram assemblies 250 are disposed in pairs wherein the ram assemblies 250 in a pair move in generally opposite directions. That is, as one ram assembly 250 is moving upwardly, the other ram assembly 250 is moving downwardly. The operating mechanism motor 152 drives the crankshaft 150. The link assembly 180 couples the crankshaft 150 to the ram assemblies 250 and, in an exemplary embodiment, reduces stress on the ram assemblies 250. A ram assembly 250, as used herein, may include a redraw mechanism 270. Alternatively, a redraw mechanism 270 may be considered an independent component or as part of the tool pack 16, but in the following description the redraw mechanism 270 is considered part of a ram assembly 250.

As shown in FIG. 1, the crankshaft 150 is rotatably coupled to the housing assembly 11. The operating mechanism motor 152 drives the crankshaft 150. In an exemplary embodiment, operating mechanism motor 152 is an AC induction motor driven by a variable frequency drive. As shown, the operating mechanism motor 152 includes a rotating output shaft 154 that is operatively coupled to the crankshaft 150. As used herein, and in connection with a motor, "operatively coupled" means that the element operatively coupled to the motor is coupled so as to respond to the motion created by the motor's output shaft; the coupling may be direct, such as, but not limited to, output shaft coupled directly to an axle, or, indirect such as, but not limited to, an output shaft coupled via a belt to an axle. As shown in FIG. 2, the operating mechanism motor 152 is operatively coupled, via a belt 156, to a clutch/brake assembly 158. The clutch/brake assembly 158 is coupled to crankshaft 150 and, more specifically, to a shaft 160 of the crankshaft 150.

As shown in FIG. 9, the crankshaft 150 includes the shaft 160 as well as a number of offset crankpins 162. Each crankpin 162 has an outer surface (not shown) that acts as a journal. As such, each crankpin 162 is hereinafter identified as a crankpin journal 164. In an exemplary embodiment, the crankpin journals 164 are provided in pairs and, as shown, the following description will address a crankshaft 150 including two crankpin journals 164. It is understood, however, that the claimed concept is not limited to two crankpin journals 164. Each crankpin journal 164 is maintained in a position offset from the axis of the shaft 160 by a yoke 166. Each yoke 166 includes two elongated yoke members 170, 172. Each yoke member 170, 172 includes a first end 174 and a second end 176. Each yoke first end 174 includes a shaft opening 175 and each yoke second end 176 includes a distal opening 177, i.e., an opening that is distal to the axis of rotation of the crankshaft 150. Shaft 160 is fixed to each yoke member 170, 172 at a shaft opening 175. Each crankpin journal 164 is fixed to the yoke members 170, 172 between opposed distal openings 177. Each yoke member 170, 172 may include a counterbalance such as, but not limited to, a lobe 178.

Further, as shown, when a crankshaft 150 includes two crankpin journals 164, the crankpin journals 164 are disposed substantially on opposite side of shaft 160. As used herein, crankpin journals 164 are disposed substantially on opposite side of shaft 160 shall be identified as "opposing crankpin journals." In this configuration, and when a linkage 184 (described below) is coupled to each crankpin journal 164, the linkages 184 will move in opposition to each other. That is, for example, if one linkage 184 is moving upwardly, the other linkage 184 will be moving downwardly.

Each crankpin journal 164 is one component of a rotational coupling. As used herein, a "rotational coupling" is a coupling linking two components that allows the components to rotate relative to each other. A "rotational coupling" may include, but is not limited to, a substantially circular opening in one, or both components, and a substantially circular pin corresponding to, and passing through, the opening. For example, each crankpin journal 164 is a substantially circular pin that passes through a pivot rod first end opening (described below). It is understood, however, that a "rotational coupling" may have an alternate configuration such as, but not limited to, a substantially circular lug extending from one component into a substantially circular opening in the other component. Further, a rotational coupling 181, in an exemplary embodiment, includes a bearing or other friction reducing device. All rotational couplings shall be identified by reference number 181 and shall be preceded by a description of its location on another component.

The link assembly 180 includes a number of links 182 wherein the links 182 are coupled to form a linkage 184. It is understood that there is one linkage 184 for each ram assembly 250. As such, the following description will address a single linkage 184; it is understood that each linkage is substantially similar.

In one exemplary embodiment, the link assembly 180 includes at least one rotational coupling 181 disposed between the crankshaft 150 and a ram body 252. For example, in one exemplary embodiment, not shown, the link assembly 180 includes a connecting rod 190 and a slider 240. The slider 240 is discussed in detail below. The connecting rod 190 is an elongated body 191 that includes a first end 192 and a second end 194. The connecting rod first end 192 includes a rotational coupling 181 and the connecting rod second end 194 also includes a rotational coupling 181. The connecting rod first end rotational coupling 181 is rotatably coupled to a crankpin journal 164. The connecting rod second end rotational coupling 181 is rotatably coupled to a slider 240, and more specifically a slider body 242 which is coupled to a ram body 252.

In the embodiment described above, rotation of the crankshaft 150 causes a ram body 252 to reciprocate along a generally vertical axis, as described below. With a single link, however, the conversion of rotational motion to linear motion applies stress to the various components, such as, but not limited to high normal slide forces against the slide guidance rails (slider channels). Thus, in another exemplary embodiment, shown in FIG. 9, each linkage 184 further includes a swing arm 200 and a pivot rod 210. The swing arm 200 includes a pivot member 202 and a yoke 204. The swing arm yoke 204 extends generally radially from swing arm pivot member 202. That is, the swing arm yoke 204 has a first end 206 that is coupled to the swing arm pivot member 202. Further, the swing arm yoke 204 has a second end 208 that includes a rotational coupling 181. The swing arm pivot member 202 is rotatably coupled to the housing assembly 11.

The pivot rod 210 is an elongated body 211 that includes a first end 212 and a second end 214. The pivot rod first end 212 includes a rotational coupling 181. The pivot rod second end 214 includes a rotational coupling 181. When assembled, the linkage 184 includes the connecting rod first end rotational coupling 181 rotatably coupled, and in an exemplary embodiment directly rotatably coupled, to a crankpin journal 164. The connecting rod second end is rotatably coupled, and in an exemplary embodiment directly rotatably coupled, to the pivot rod first end rotational coupling 181. The pivot rod second end rotational coupling 181 is rotatably coupled to a slider 240, and more specifically a slider body 242 which is coupled to a ram body 252. The swing arm second end rotational coupling 181 is rotatably coupled to the connecting rod second end rotational coupling 181. In this configuration, the swing arm 200 limits the range of motion of the linkage 184 thereby reducing stress on the components thereof. For example, limiting the range of motion of the linkage 184 significantly reduces the normal slide force against the slide guidance rails (slider channels).

The housing assembly 11 includes a number of ram guides 230 (FIG. 1) and slider channels 232 (FIG. 1). Each ram guide 230 defines an opening (not shown). If there are more than two ram guides 230 for a single ram assembly 250, the ram guide openings are disposed on a generally vertical line. The slider channels 232 are disposed in opposed pairs and, as shown include members having U-shaped cross-sections. The slider channels 232 are also disposed generally vertically and are positioned about the generally vertical line passing through the ram guides 230. In this configuration, the housing assembly 11, and more specifically the ram guides 230 and slider channels 232, defines paths of travel that extend generally vertically. That is, the ram assemblies 250 are structured to reciprocate over the ram paths.

The slider 240 includes a body 242, as shown a generally rectangular body, including a rotational coupling 181. The slider body 242 has an upper surface 244 and two lateral sides 246, 248. The slider body lateral sides 246, 248 are sized to correspond to the slider channels 232. The slider body 242 is disposed in the slider channels 232 and moves between a first lower position in the slider channels 232 and a second upper position in the slider channels 232. Thus, the slider body 242 reciprocates generally vertically. As noted above, the pivot rod second end rotational coupling 181 is rotatably coupled to the slider body 242.

As with the linkage 184, the ram assemblies 250 are substantially similar and a single ram assembly 250 will be described. The ram assembly 250 includes an elongated ram body 252 and a punch 254. The ram assembly 250, and more specifically the ram body 252, has a longitudinal axis 251 that extends generally vertically. As is known, the ram assembly 250 may include other components, e.g., a pneumatic system (not shown) structured to eject a can body 2 from the punch 254; such components are not, however, relevant to the presently disclosed concept. When disposed in a vertical orientation, the ram body 252 includes a lower, first end 256 and an upper second end 258. The ram body first end is coupled to, and in one embodiment fixed to, the slider body upper surface 244. The punch 254 is coupled to, and in one embodiment fixed to, the ram body second end 258. In this configuration, the ram body 252, as well as the punch 254, reciprocate over a generally vertical path. That is, each ram assembly 250, and more specifically each ram body 252, moves between a retracted, lower first position and an extended, upper second position. The path over which each ram assembly 250 moves is the "path of travel" or "path." Further, each ram assembly 250 has a "forward stroke" when moving from the first position to the second position and a "return stroke" when moving from the second position to the first position. As discussed below, each ram assembly 250, and more specifically each punch 254, is structured to pick up a cup 1 and move the cup 1 through the tool pack during the forward stroke. Further, as discussed above, each ram body 252 is coupled to one of two linkages 184 in a pair. As further described above, the linkages 184 are coupled to opposing crankpin journals 164. The configuration wherein the linkages 184 are coupled to opposing crankpin journals 164 cause the sliders 240 to move in opposite directions.

Thus, if the number of ram assemblies 250 is two, there is a first ram assembly 250A and a second ram assembly 250B. When the first ram assembly 250A is in the first position, the second ram assembly 250B is substantially in the second position, and, when the first ram assembly 250A is in the second position, the second ram assembly 250B is substantially in the first position. When the first ram assembly 250A is moving forward, i.e., during the forward stroke, the second ram assembly 250B is moving backward, i.e., during the return stroke.

As with the linkage 184, the redraw mechanism 270 are substantially similar and a single redraw mechanism 270 will be described. The redraw mechanism 270, shown largely in FIG. 3, includes a redraw die 271 and a clamping device 272. In an exemplary embodiment wherein the redraw mechanism 270 is driven by the crankshaft 150, the crankshaft 150 includes a number of redraw cams 274 (FIG. 9) and the link assembly 180 includes a number of push rods 275 (FIG. 1). As is known, the redraw die 271 defines a passage 278 corresponding to the size and shape of a ram body 252. As described above, a cup feed assembly 12 positions a cup 1 below the redraw die 271 and above the redraw mechanism 270. More specifically, the cup 1 is positioned so as to be aligned with the redraw die passage 278. The redraw die clamping device 272, in an exemplary embodiment, is a hollow sleeve 279. The sleeve 279 has an outer diameter corresponding to a cup 1 inner diameter. The sleeve 279 further has an inner diameter corresponding to a punch body 254 outer diameter. In operation, when a cup 1 is disposed below the redraw die 271, the sleeve 279 moves upwardly into the cup 1 and biases, i.e., clamps, the cup 1 against the bottom of the redraw die 271. The ram body 252 then moves through the sleeve 279 and picks up the cup 1 on the punch 254. That is, the cup 1 is disposed over the punch 254 and moves with the punch 254. As the punch moves through the redraw die 271, the shape of the cup 1 changes. More specifically, the diameter of the cup 1 is reduced to substantially correspond to the diameter of the punch 254. This reshaping elongates the cup 1, but does not effectively thin the cup sidewall 4.

The redraw die clamping device 272 is actuated by the crankshaft 150. That is, the sleeve 279 is movably coupled to the housing assembly 11 and is structured to move over a vertical path. The sleeve 279 is further coupled to a number of push rods 275. As shown, a redraw link 276 may be an elongated rod 280 disposed in generally vertically oriented redraw link guides 282, i.e., guide structures having vertically aligned openings. As shown, each sleeve 279 is coupled to two push rods 275 with the push rods 275 being disposed on opposite sides of the sleeve 279. The lower end of each redraw link 276 engages the crankshaft 150 and more specifically a redraw cam 274.

That is, as shown in FIG. 9, a number of redraw cams 274 are fixed to the shaft 160 and rotate therewith. The redraw cams 274 have an outer cam surface 290. The radius of the outer cam surface 290 is variable having a minimum radius and a maximum radius. As the crankshaft 150 rotates, the lower end of each redraw link 276 moves over an outer cam surface 290. When a redraw link 276 engages the minimum radius of an outer cam surface 290, the sleeve 279 is in a retracted, first position and the cup feed assembly 12 may position a cup 1 below and adjacent to the redraw mechanism 270. When a redraw link 276 engages the maximum radius of an outer cam surface 290, the sleeve 279 is in an extended, second position and clamps the cup 1 against the redraw die 271 as described above. The elongated arc of the maximum radius of an outer cam surface 290 provides a dwell time for the redraw die clamping device 272 so that the cup remains clamped while the ram body 252 passes through the sleeve 279 and the cup body through the redraw die 271. Thus, the rotation of the crankshaft 150 actuates each clamping device 272.

Figure 10:
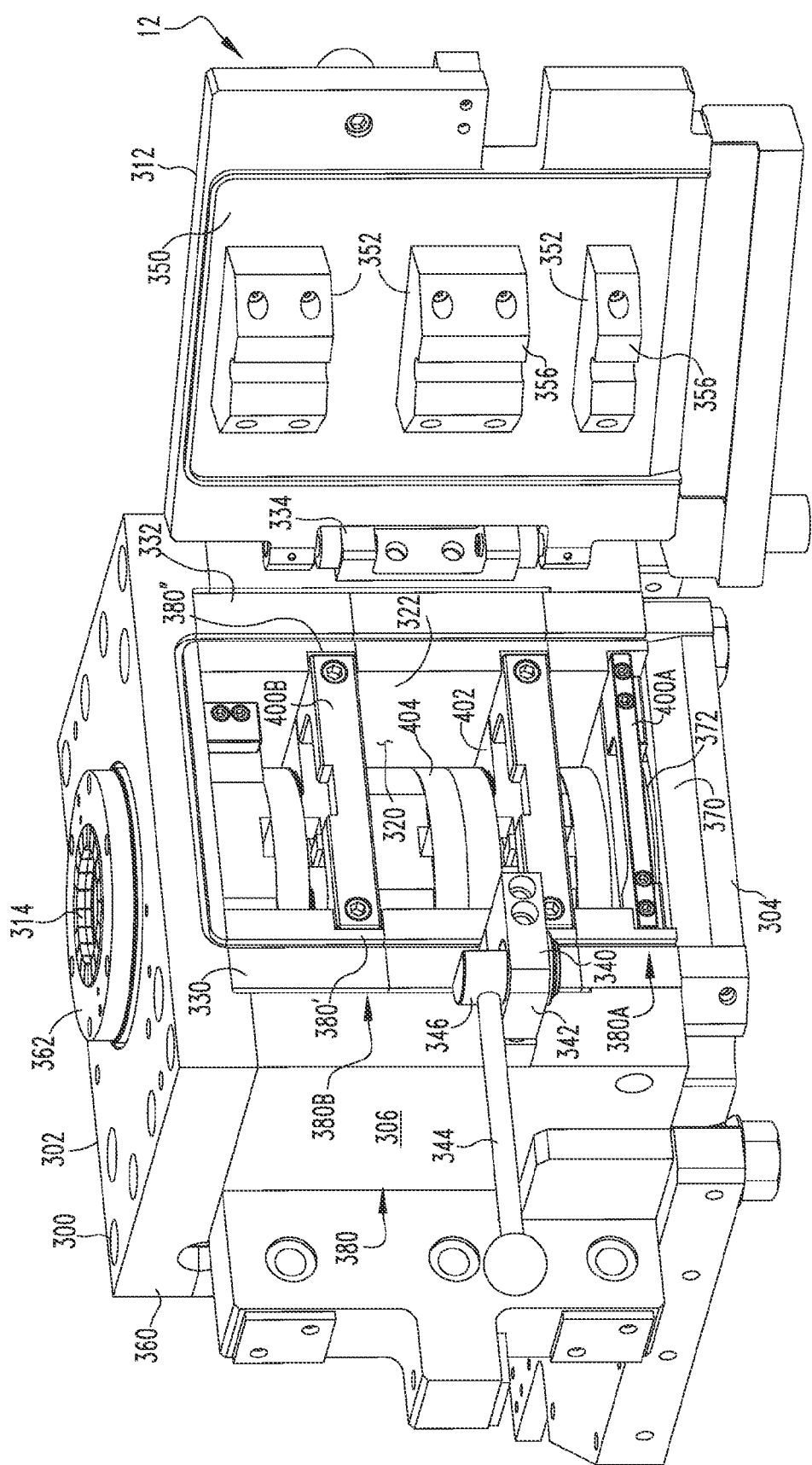
FIG. 10 is an isometric view of a tool pack.
Figure 11:
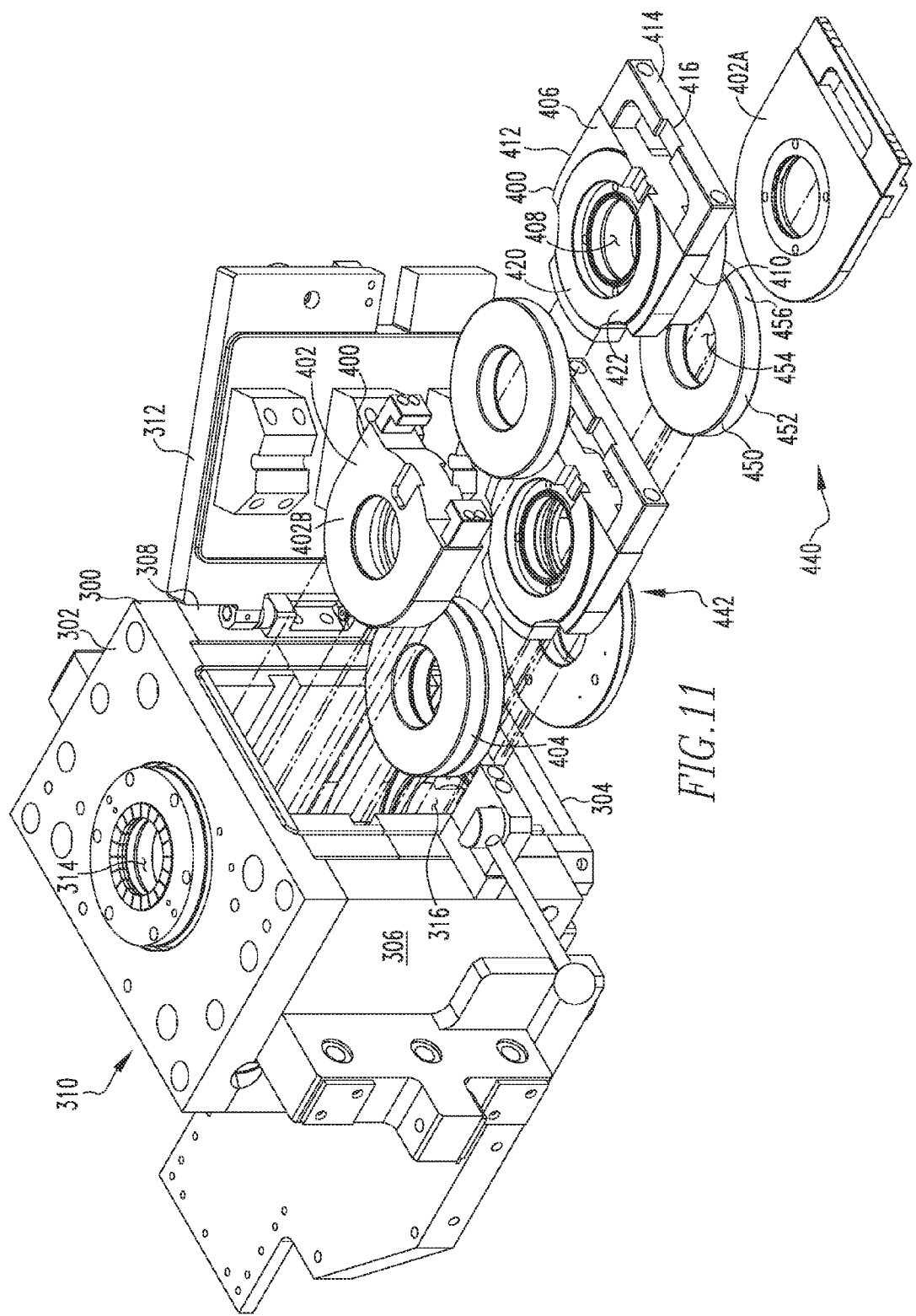
FIG. 11 is a partially exploded isometric view of a tool pack.
Figures 12, 12A:
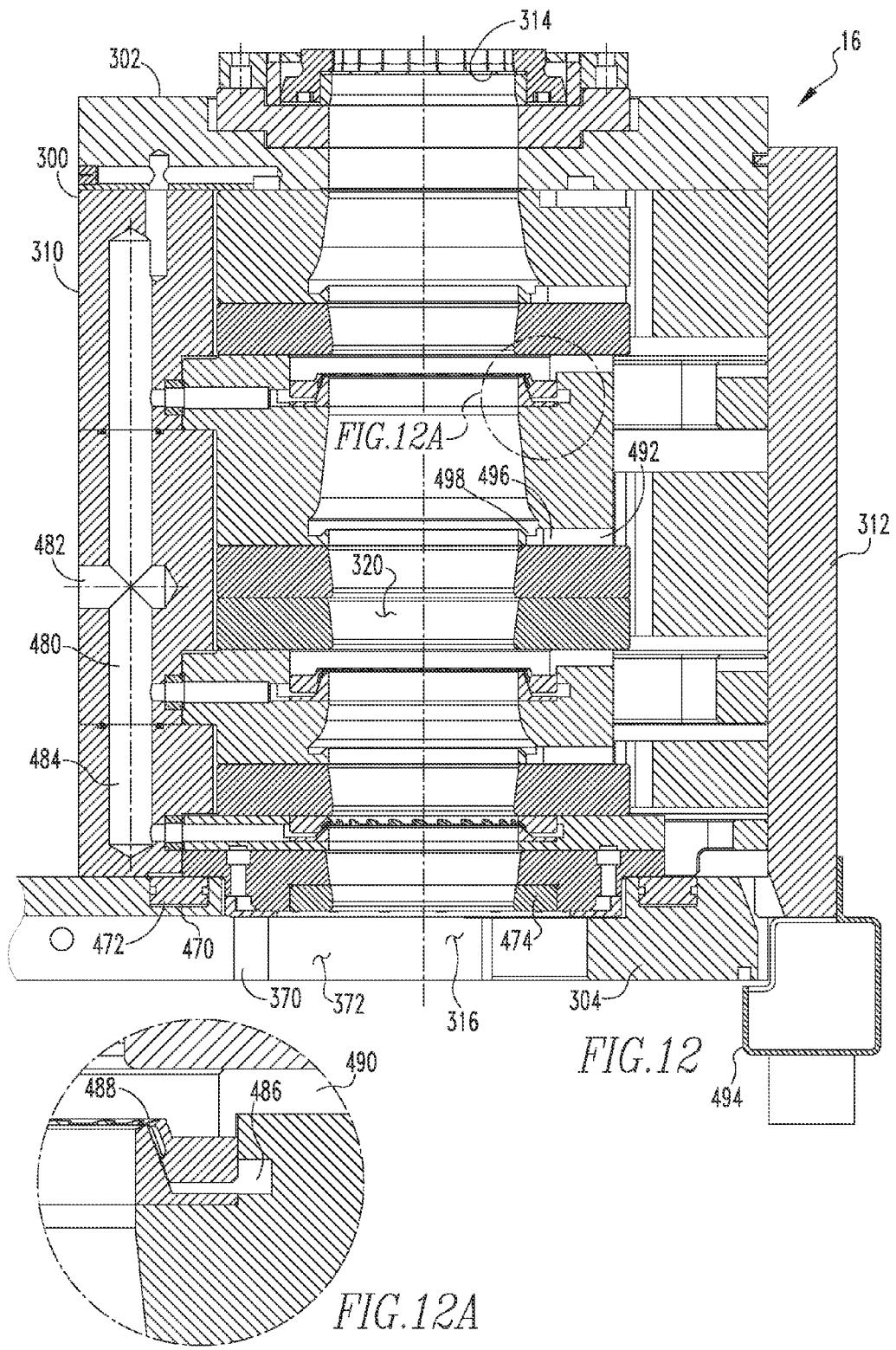
FIG. 12 is a cross-sectional view of a tool pack.
FIG. 12A is a detail view of a spray outlet.

The vertical tool pack 16 is shown in FIGS. 10-12. For a bodymaker 10 wherein the ram assemblies' 250 forward stroke is upward, each vertical tool pack 16 is coupled to the upper end of the housing assembly 11 and is generally aligned with one of the ram assemblies 250. Each vertical tool pack 16 is substantially similar and only one will be described below. The vertical tool pack 16 includes a tool pack housing assembly 300, a number of die spacers 400, a number of dies 450, and a compression device 470. Generally, the die spacers 400 and the dies 450 each define a central passage 408, 454. The die spacer central passage 408 is larger than the cross-sectional area of the ram body 252. Thus, a cup 1 disposed on the punch 254 passing through a die spacer 400 does not engage the die spacer 400. Each die passage 454 closely corresponds to the ram body 252 so that a cup 1 disposed on the punch 254 passing through each die 450 is thinned and elongated. As is known, the downstream die passages are smaller than the upstream die passages so that the cup 1 is thinned and elongated by each die 450. When the cup 1 passes through the tool pack 16 it is changed into a can body 2.

As shown in FIG. 10, the tool pack housing assembly 300 is shown as having a generally rectangular cross-section. It is understood that the tool pack housing assembly may have any shape including a generally circular cross-section (not shown). It is further understood that descriptive words applicable to a tool pack housing assembly 300 having a generally rectangular cross-section are applicable to a tool pack housing assembly having other shapes. For example, in a tool pack housing assembly having a generally circular cross-section, the portion of the housing including a door and extending over an arc of about ninety degrees would be a front side. Similarly, the portions of a circular tool pack housing assembly extending over an arc of about ninety degrees and located adjacent to the front side would be the lateral sides, and so forth.

As shown in FIG. 10, the tool pack housing assembly 300 includes an upper sidewall 302, a lower sidewall 304, a first lateral sidewall 306, a second lateral sidewall 308, a rear sidewall 310, and a door 312. In the exemplary embodiment the door 312 comprises, essentially, all of a front side. It is understood that in other embodiments, not shown, the door 312 may be less than the entire front side. The upper and lower sidewalls 302, 304 each include a central opening 314, 316. In this configuration, the tool pack housing assembly defines a passage 320 having a vertical axis. The tool pack housing assembly passage 320 includes an inner surface 322. That is, each of the tool pack housing assembly elements has an inner surface 322.

The tool pack housing assembly first lateral sidewall 306 and the tool pack housing assembly second lateral sidewall 308 each include a front surface 330, 332. The door 312 is structured to move between a first, open position, wherein the door 312 provides access to the tool pack housing assembly passage 320, and a second, closed position, wherein the door 312 inner surface is disposed immediately adjacent the first lateral sidewall front surface 330 and the tool pack housing assembly second lateral sidewall front surface 332. In an exemplary embodiment, door 312 is movably coupled to the tool pack housing assembly second lateral sidewall front surface 332 by a hinge assembly 334.

The door 312 may include a latch assembly 340. The latch assembly 340 includes a latch base 342 and a latch handle 344. The latch handle 344 is movably coupled to the first lateral sidewall 306. The latch base 342 is coupled to the door 312. The latch handle includes a cam member 346. The latch handle 344 is structured to move between an open, first position, wherein said latch handle 312 does not engage the latch base 342, and a closed, second position, wherein the latch handle cam member 346 engages the latch base 342.

The door 312 has an inner surface 350. The door 312 further includes a number of resilient bumpers 352. Each bumper 352 is coupled to the door inner surface 350 and aligned with one of the dies 450 when the die 450 is disposed in the tool pack housing assembly 300. Each bumper 352 has a thickness sufficient so that, when the door 312 is in the second position, each bumper 352 contacts one of the dies 450. Thus, when the door 312 is in the second position, each bumper 352 contacts one of the dies 450 and biases the die 450 against the tool pack housing assembly rear sidewall 310, thereby locking each die 450 in a substantially fixed orientation and location relative to the tool pack housing assembly 300. As noted below, the dies 450 may include a circular outer surface 456. The bumpers 352 include a distal surface 356 which is the surface opposite the bumper surface coupled to the door 312. Each bumper distal surface 356 is, in an exemplary embodiment, concave and has a curvature corresponding to a die body outer surface 456.

The tool pack housing assembly upper sidewall 302 includes a stripper bulkhead 360. The stripper bulkhead 360 includes a stripper element 362 structured to remove the can body 2 from the punch 254 during the return, i.e., downward, portion of the ram body 252 stroke. The tool pack housing assembly lower sidewall 304 includes a cup feed bulkhead 370. The cup feed bulkhead 370 includes a horizontally centering cavity 372 for the redraw die 271. That is, the cup feed bulkhead horizontally centering cavity 372 is structured to horizontally center the redraw die 271 when the redraw die 271 is disposed therein. That is, the cup feed bulkhead horizontally centering cavity 372 is structured to position the redraw die 271 concentrically about the ram 250 path of travel 13. Further, in an exemplary embodiment, each spacer 400A, 400B (discussed below) also includes a centering cavity 422

(discussed below) structured to position a supported die concentrically about the ram 250 path of travel 13.

The tool pack housing assembly inner surface 322 defines a number of pairs of horizontal slots 380. Each pair of horizontal slots 380 includes opposed slots 380', 380" on the tool pack housing assembly first lateral sidewall 306 and the tool pack housing assembly second lateral sidewall 308. Each slot 380', 380" is sized to loosely correspond to the height of an associated die spacer 400. That is, specific die spacers 400A, 400B (discussed below) have very different heights and are structured to be placed in a specific pair of slots 380. As used herein, "associated" means that the identified elements are related to each other or are intended to be used together. For example, die spacer 400A is a thinner die spacer and is intended to be placed in a thinner pair of slots 380A. Thus, the height of the thinner pair of slots 380A loosely corresponds to the height of an associated die spacer 400A. Similarly, die spacer 400B is a thicker die spacer and is intended to be placed in a thicker pair of slots 380B. Thus, the height of the thicker pair of slots 380B loosely corresponds to the height of an associated die spacer 400B. It is further understood that the height of a specific pair of slots 380 does not loosely correspond to a die spacer 400 that is not "associated" with that specific pair of slots 380. For example, the height of a thinner pair of slots 380A does not loosely correspond to the height of a thicker die spacer 400B.

In an exemplary embodiment, each pair of horizontal slots 380 has a height between about 0.040 inch and 0.050 inch greater than the die spacer 400 associated with that specific pair of horizontal slots. In another exemplary embodiment, each slot 380', 380" in a specific pair of horizontal slots 380 has a height about 0.045 inch greater than the specific die spacer 400 associated with that specific pair of horizontal slots 380. In an alternate exemplary embodiment, each pair of horizontal slots 380 has a height between about 0.025 inch and 0.040 inch greater than the die spacer 400 associated with that specific pair of horizontal slots. In another alternate exemplary embodiment, each slot 380', 380" in a specific pair of horizontal slots 380 has a height about 0.03 inch greater than the specific die spacer 400 associated with that specific pair of horizontal slots 380.

The number of die spacers 400 includes supported die spacers 402 and floating die spacers 404. Supported die spacers 402 are those die spacers 400 that are supported by the tool pack housing assembly inner surface 322. Floating die spacers 404 are spacers 400 disposed on dies 450 or other spacers 400. Each die spacer 400 includes a body 406 defining a central passage 408. Each die spacer central passage 408 is larger than the cross-sectional area of the punch 254. Thus, the punch 254, and a cup 1 disposed thereon, pass freely through the die spacers 400. Each die spacer 400 has a height. The number of die spacers 400 and the number of dies 450 have a height, collectively, that loosely corresponds with the height of the cavity defined by the tool pack housing assembly 300. The die spacers 400, however, may have varying heights. Each supported die spacer 402 is associated with a specific pair of horizontal slots 380. As noted above, and in an exemplary embodiment, a supported die spacer 402 may be a thinner supported die spacer 402A or a thicker supported die spacer 402B. As discussed below, each die spacer 400 may include a number of passages 490 which are part of a coolant system 480.

Each supported die spacer 402 includes two lateral sides 410, 412. The supported die spacer lateral sides 410, 412 are shaped to correspond to the shape of the tool pack housing assembly 300. That is, as shown, when the tool pack housing assembly 300 is generally rectangular, the supported die spacer lateral sides 410, 412 are generally parallel and straight. Each supported die spacer 402 has a door side 414. The supported die spacer door side 414 includes a removal tool coupling 416. That is, the removal tool coupling 416 is one element of a coupling that is structured to be coupled to a removal tool (not shown). In the exemplary embodiment shown in FIG. 11, the removal tool coupling 416 is a notch in the supported die spacer door side 414.

Each supported die spacer 402 includes an upper surface 420. Each supported die spacer upper surface 420 includes a horizontally centering cavity 422 sized to correspond to an associated die 450. As used herein, an "associated die" is the die 450 intended to be disposed on the associated supported die spacer 402. The supported die spacer horizontally centering cavity 422 is structured to horizontally center a die 450 therein. That is, as noted above, the centering cavity 422 is structured to position a supported die 450 concentrically about the ram 250 path of travel 13. In an alternate embodiment, not shown, the dies 450 are positioned by positioning rails (not shown).

In this configuration, the die spacers 400 may be easily moved into and out of the tool pack housing assembly 300. For example, initially, the dies 450 associated with the specific supported die spacers 402 are disposed in the supported die spacer horizontally centering cavity 422. If a floating die 404 is required, the floating die 404 may be placed on the relevant dies 450. The supported die spacers 402 are then moved into the tool pack housing assembly 300 by placing the supported die spacers 402 in their associated pairs of slots 380. As discussed below, the compression device 470 locks the dies 450 and die spacers 400 in place. When the compression device 470 is released, the dies 450 and die spacers 400 may be removed, e.g., by using the removal tool to pull the supported die spacers 402 from their slots 380. Accordingly, because removal and replacement is easily accomplished, the number of dies 450 may include a first set of dies 440 having a first internal diameter (as discussed below) and a second set of dies 442 having a second internal diameter, wherein in one of the first set of dies 440 or the second set of dies 442 is disposed in the tool pack housing assembly 300.

The dies 450 include a body 452 defining a central passage 454. In an exemplary embodiment, the die bodies 452 have a generally circular outer surface 456. The die central passage 454 has an internal diameter. Each die central passage 454 corresponds to the cross-sectional area, i.e., has a diameter that corresponds, to the punch 254. More specifically, as discussed above, each die central passage 454 is slightly more narrow than the preceding die 450 (i.e., in the direction of travel of the ram assembly during the forward stroke). In this configuration, each die 450 thins the cup sidewall 4 and elongates the cup 1. In an exemplary embodiment, the dies 450 are a generally torus shaped and have an outer diameter as well. The supported die spacer horizontally centering cavity 422 and the bumper distal surfaces 356 correspond to the shape of the die 450 outer surface. As noted above, the dies 450 and die spacers 400 are disposed in the tool pack housing assembly 300.

The compression device 470 shown in FIG. 12, is structured to provide axial compression to the stack of dies 450 and die spacers 400. As shown, the compression device 470 is disposed at the lower end of the tool pack housing assembly 300, i.e., at the tool pack housing assembly lower sidewall 304. In this configuration, the compression device 470 axially biases the die spacers 400 by applying an upward force. Because, as noted above, the number of die spacers 400 and the number of dies 450 have a height, collectively, that loosely corresponds with the height of the cavity defined by the tool pack housing assembly 300, applying an upwardly biasing force compresses the number of die spacers 400 and the number of dies 450, thereby, effectively, locking the number of die spacers 400 and the number of dies 450 in place. It is further noted that, because the pairs of slots 380 have a height slightly greater than the height of the associated die spacer, the die spacers 400 do not directly engage, or otherwise apply bias to, the first lateral sidewall 306 or the second lateral sidewall 308. That is, the bias created by the compression device 470 is applied, through the stack of die spacers 400 and dies 450, to the upper sidewall 302. The compression device 470 includes a lifting piston 472. The lifting piston 472, in an exemplary embodiment, has a torus shaped body 474.

The tool pack housing assembly 300 and die spacers 400 include a coolant system 480. That is, the coolant system 480 includes a number of passages that may be passages within specific components, such as, but not limited to, the rear sidewall 310 or a die spacer 400, but may also be created by a gap between adjacent elements, e.g., a gap between a die 450 and a die spacer 400. The coolant system 480 includes an inlet 482, a distribution passage 484, a number of die spacer manifolds 486, a number of spray outlets 488, a number of collection passages 490, a drain passage 492, and a trough 494. The inlet 482 is disposed on the tool pack housing assembly 300. The inlet 482 is coupled to, and in fluid communication with, a coolant source (not shown). The distribution passage 484 is disposed in the tool pack housing assembly 300. As shown, the distribution passage 484 extends generally vertically, thereby providing access to the die spacers 400. The distribution passage 484 is coupled to, and in fluid communication with, the inlet 482. A number of die spacers 400, and more specifically a number of supported die spacers 402, include a die spacer manifold 486. In an exemplary embodiment, a die spacer manifold 486 is a passage extending about the die spacer passage 408. Each die spacer manifold 486 is coupled to, and in fluid communication with, the distribution passage 484.

Each said die spacer 400 further includes a number of spray outlets 488. Each spray outlet 488 is coupled to, and in fluid communication with, a die spacer manifold 486 as well as the die spacer passage 408. Each spray outlet 488 is structured to spray a coolant into, and in an exemplary embodiment, at an upward angle into, the die spacer passage 408. Each collection passage 490 has a first end 496 disposed adjacent to the pack housing assembly passage 320. Each collection passage 490 is structured to collect fluid in the tool pack housing assembly passage 320. In addition to the collection passage 490, a number of die spacers 400 include a collection reservoir 498. The collection reservoir 498 is a cavity disposed about die spacer passage 408. The collection reservoir 498 is coupled to, and in fluid communication with, a collection passage 490. Each collection passage 490 is coupled to, and in fluid communication with, the drain passage 492. The drain passage 492 is, coupled to, and in fluid communication with, the trough 494. The trough 494 is an enclosed chamber disposed at the lower end of the tool pack housing assembly 300. The trough 494 is further coupled to, and in fluid communication with, an external drain system (not shown). Thus, a coolant may be sprayed on the cup 1 and ram assembly 250 when the bodymaker 10 is in operation.

Figure 13:
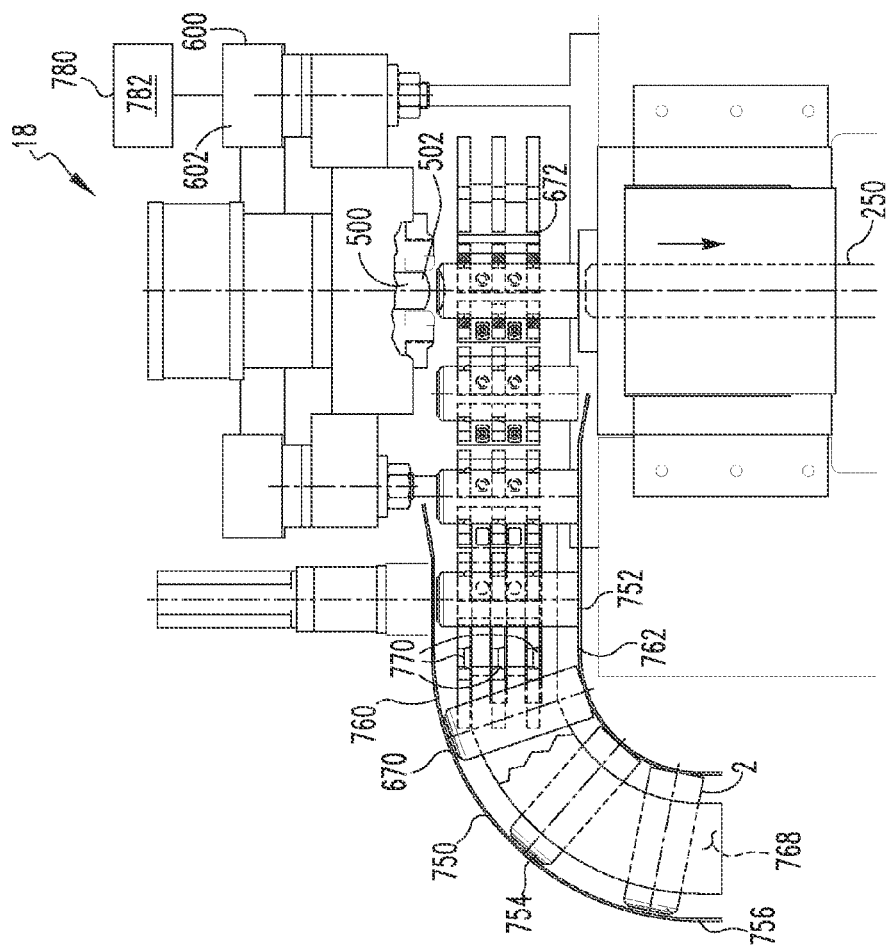
FIG. 13 is a front view of a can body take-away assembly.
Figure 14:
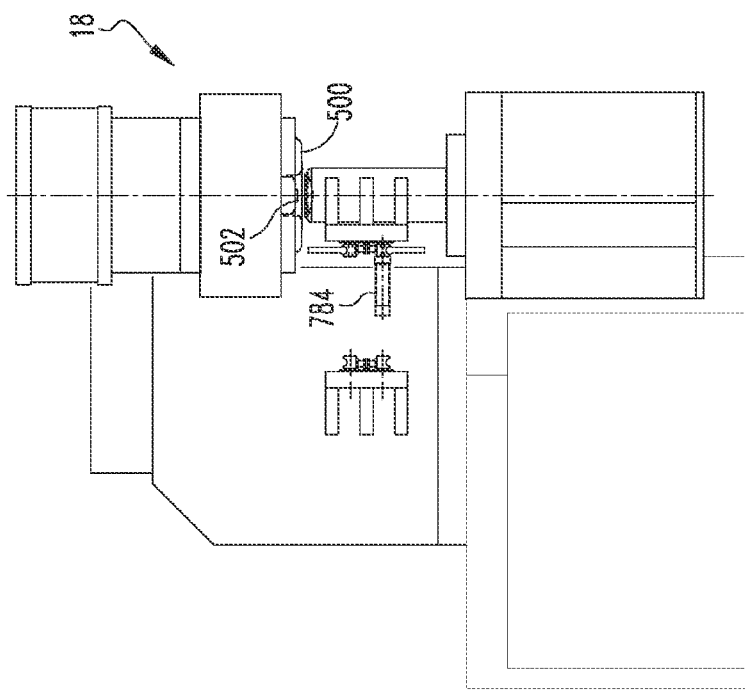
FIG. 14 is a cross-sectional side view of a can body take-away assembly.

Further, as is known and shown in FIG. 13, the bodymaker 10 may include a domer 500. The domer has a convex die 502 disposed adjacent, but spaced from, the tool pack 16. When the ram assembly 250 is in the second, extended position, the punch 254, which includes a concave axial surface (not shown), is disposed immediately adjacent the domer 500. In this configuration, the cup 1 contacts the domer 500 creating a concave cup bottom 3 and completes the transformation of the cup 1 to a can body 2. At this point in the process, the can body 2 is supported by the ram assembly 250. The can body 2 is then stripped from the punch 254 when the ram body 252 reverses direction and the can body 2 contacts the stripper element 362. Additionally, or in the alternative, the ram assembly 250 may include a can ejector such as, but not limited to, a pneumatic system that injects compressed air between the can body 2 and the punch 254. The result is that the can body 2 is separated from the ram assembly 250 at a location between the tool pack 16 and the domer 500.

As noted above, for a bodymaker 10 wherein the ram assemblies 250 forward stroke is upward, the take-away assemblies 18 are coupled to a housing assembly upper end 19, i.e., generally above the ram assembly 250. The take-away assemblies 18 are structured to grip or hold a can body 2 after the can body 2 is ejected from the ram assembly 250. Each take-away assembly 18 is substantially similar and only one will be described below. Generally, the take-away assembly 18 is structured to lightly grip a can body 2 as the ram assembly 250 completes its forward stroke and to move the can body 2 away from the path of travel of the ram assembly 250 during the ram assembly return stroke. The take-away assembly 18 is further structured to reorient the can body 2 from a vertical orientation to a horizontal orientation.

Figure 15:
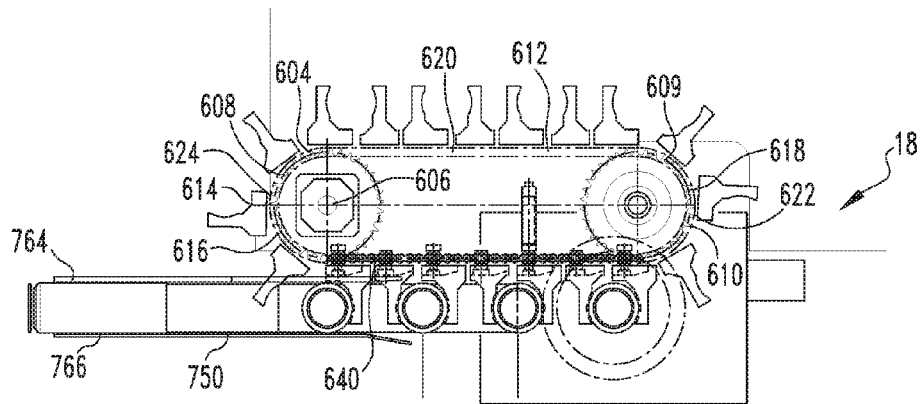
FIG. 15 is a top view of a can body take-away assembly.

As shown in FIGS. 13-17, the take-away assembly 18 includes a drive assembly 600 and a can body transport assembly 670. The drive assembly 600 includes a motor 602 and a support member 604 (FIGS. 15 and 16). The take-away assembly motor 602 includes a rotating output shaft 606 coupled to a rotating drive sprocket 608. The drive sprocket 608 is coupled to the drive assembly support member 604. Thus, the take-away assembly motor 602 is operatively coupled to the drive assembly support member 604 and is structured to move the drive assembly support member 604.

Further, the take-away assembly motor 602 is structured to provide an indexed motion to the drive assembly support member 604. That is, the take-away assembly motor 602 is in either actuated, first configuration, wherein the take-away assembly motor 602 provides motion to the drive assembly support member 604, or in a stationary, second configuration, wherein the take-away assembly motor 602 does not provide motion to the drive assembly support member 604. As discussed below, the motion of the take-away assembly motor 602 may be controlled by command signals provided to the take-away assembly motor 602 by a controller 782 (shown schematically) or sensors 784, discussed below. Thus, the take-away assembly motor 602 is structured to receive and respond, i.e., react, to command signals from controller 782 or sensors 784. In an alternative embodiment, the take-away assembly motor 602 is a servo-motor programmed to provide an indexed motion to the drive assembly support member 604.

Figure 18:
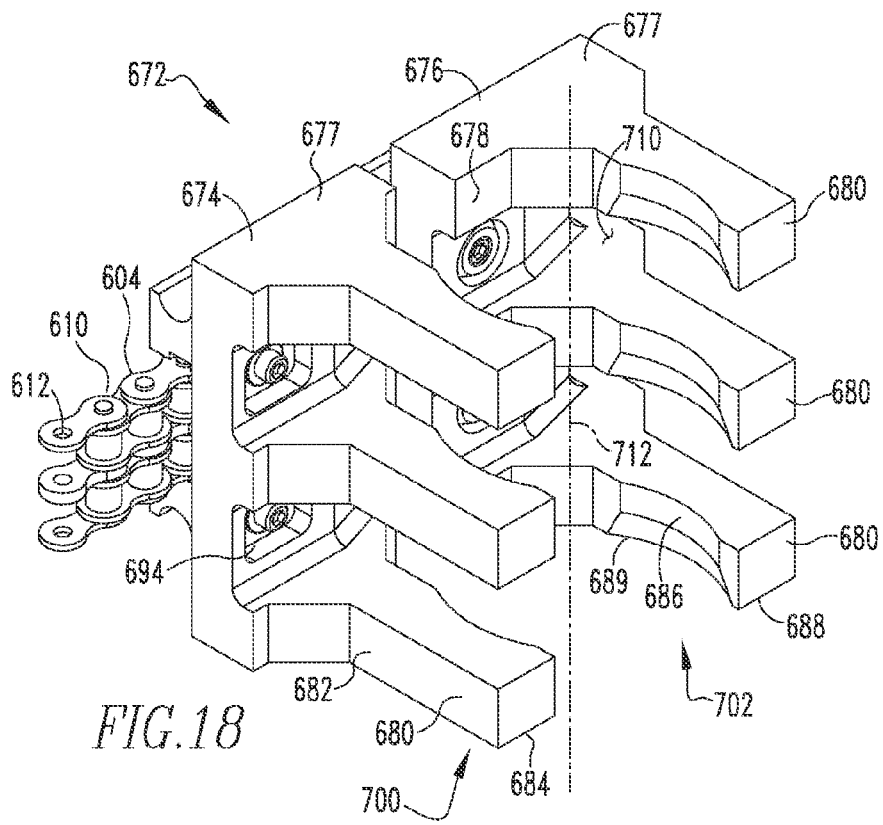
FIG. 18 is a front detail isometric view of a gripping assembly.
Figure 19:
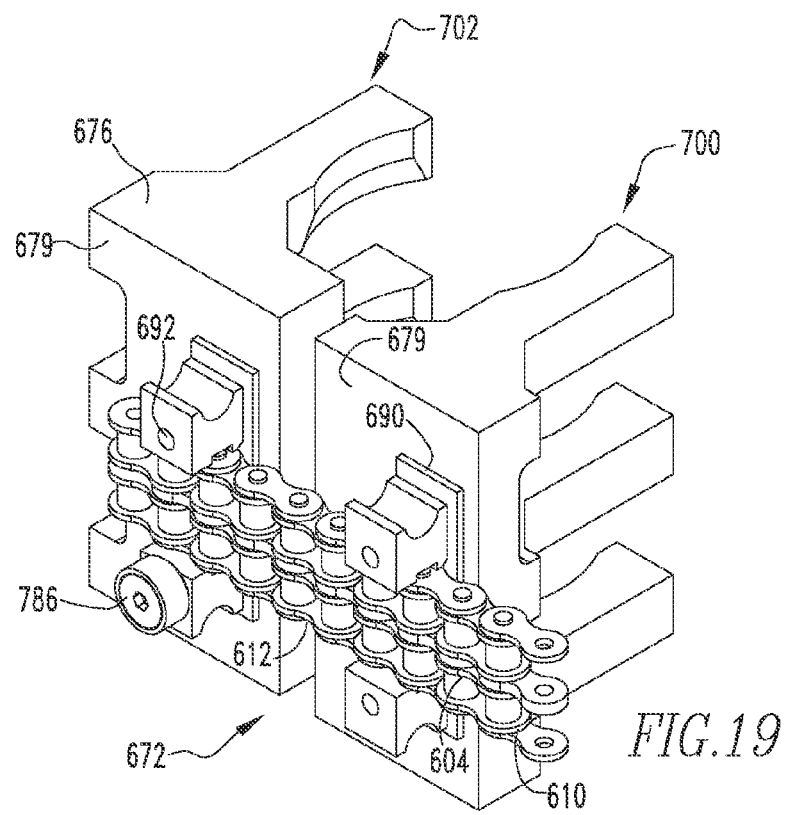
FIG. 19 is a rear detail isometric view of a gripping assembly.

The drive assembly support member 604 is structured to support a number of gripping assemblies 672, as discussed below. The drive assembly support member 604 is, in an exemplary embodiment, a tension member 610. As used herein, a "tension member" is a construct that has a maximum length when exposed to tension, but is otherwise substantially flexible, such as, but not limited to, a chain or a belt. As shown in FIGS. 18 and 19, and in an exemplary embodiment, tension member 610 is a roller chain 612. Tension member 610 is, in an alternate embodiment (not shown) a timing belt. The roller chain 612 forms a generally horizontal loop 614 (FIG. 15). The loop 614 includes a first end 616 and a second end 618. The drive sprocket 608 is disposed at the loop first end 616 and an idler sprocket 609 is disposed at the loop second end 618. The drive sprocket 608 engages the roller chain 612. Thus, the drive assembly support member 604, and in this embodiment the roller chain 612 moves in a generally horizontal direction. The drive assembly support member 604, and in this embodiment the roller chain 612 is disposed adjacent to the domer 500. More specifically, the drive assembly support member 604 is disposed adjacent the gap between the tool pack 16 and the domer 500. Thus, the drive assembly support member 604 is disposed adjacent to the location wherein a cup body is ejected from the ram assembly 250. Further, the drive assembly support member 604 travels over a path 620 (or path of travel) that corresponds to generally horizontal loop 614. That is, the drive assembly support member path 620 is also a horizontal loop including a first end 622 and a second end 624.

The drive assembly 600 further includes a tension member support 630. That is, a tension member 610 may sag and the tension member support 630 is structured to support and guide the tension member 610. The tension member support 630 includes a lower support element 632 and an upper support element 634. The lower support element 632 and upper support element 634 each include a distal surface 636, 638 which defines a generally planar track 640. The track 640 defines the path the tension member 610 follows. As shown, in an exemplary embodiment, the track 640 is generally oval.

The tension member 610, in an exemplary embodiment, includes a number of lower support blocks 650 and upper support blocks 652. The lower support blocks 650 and upper support blocks 652 are structured to be movably coupled to the lower support element 632 and the upper support element 634, respectively. The lower support blocks 650 and upper support blocks 652 are coupled to, and in an exemplary embodiment fixed to, the tension member 610. In an exemplary embodiment, the lower support blocks 650 and upper support blocks 652 are relatively small compared to the length of the tension member 610 and are spaced out over the length of the tension member 610. The lower support blocks 650 are disposed on the lower side of tension member 610, and more specifically the lower side of roller chain 612. The upper support blocks 652 are disposed on the upper side of tension member 610, and more specifically the upper side of roller chain 612.

Each lower support block 650 and upper support block 652 includes a track engagement surface 654, 656, respectively. The track engagement surfaces 654, 656 correspond to the shape of the lower and upper support element distal surfaces 636, 638. That is, as shown in FIG. 16, in an exemplary embodiment the lower and upper support element distal surfaces 636, 638 are rounded and the track engagement surfaces 654, 656 are an arcuate groove 658, 660. The lower support block and upper support block track engagement surfaces 654, 656 are movably coupled, and more specifically movably directly coupled, to the lower support element 632 or upper support element 634, respectively. In this configuration the tension member 610 travels between the lower support element 632 and the upper support element 634. In another embodiment, the tension member support 630 includes only a lower support element 632. In such an embodiment, the tension member 610 travels over the lower support element 632.

As shown in FIGS. 13 and 18-19, the can body transport assembly 670 includes a number of gripping assemblies 672 and a reorienting chute 750. The gripping assemblies 672 are substantially similar and only a single gripping assembly 672 will be described. Each gripping assembly 672, shown in FIGS. 18 and 19, is structured to travel across the path of the ram and to selectively grip a can body 2. Each gripping assembly 672 includes a first base member 674 and a second base member 676. Each first base member 674 and second base member 676 includes a body 677 having an outer side 678 and an inner side 679. The first and second base outer side 678 and inner side 679 extend in a generally vertical plane. Each first base member 674 and second base member 676 includes a number of resilient elongated gripping members 680. Each resilient elongated gripping member 680 extends generally horizontally from the first and second base outer side 678. The gripping members 680 extending from the first base member 674 and second base member 676 are generally disposed in the same horizontal plane and, as such, are opposed to each other. That is, the gripping members 680 are opposed gripping members 680 which are opposed across a gripping space vertical axis 712 (discussed below).

Each first base member 674 and second base member 676 is coupled to the drive assembly support member 604 and, more specifically on the outer side of loop 614. In an exemplary embodiment, second base member 676 is fixed to tension member 610. Each first base member 674 is movably and selectively coupled to the drive assembly support member 604. That is, each first base member 674 is adjustably coupled to the drive assembly support member 604 and may be shifted horizontally toward or away from the second base member 676.

In an exemplary embodiment, each first base member 674 and second base member 676 includes a rigid mounting plate 690. Each mounting plate 690 is disposed on the base member body inner side 679. Each second base member 676 includes circular openings (not shown) through the body 677. Fasteners 692 corresponding to the size of the circular openings extend through the body 677 and fix the second base member 676 to the mounting plate 690. The mounting plate 690 is coupled, and in an exemplary embodiment fixed, to the drive assembly support member 604. Each first base member 674 includes a horizontally elongated opening, i.e., a slot 694 through the body 677. Fasteners 692 extend through the slot and couple the first base member 674 to the mounting plate 690. The fasteners 692 on the first base member 674 may be loosened so as to allow the first base member 674 to be adjusted horizontally relative to the fixed second base member 676. Thus, each first base member 674 is selectively positioned in one of a first position, wherein the first base member 674 has a first spacing from the second base member 676 or a second position, wherein the first base member 674 has a second spacing from the second base member 676.

It is noted that each lower support block 650 and upper support block 652 may be coupled, and in an exemplary embodiment fixed, to a mounting plate 690.

As noted above, each first base member 674 and second base member 676 includes a number of resilient elongated members 680. In an exemplary embodiment, each first base member 674 and second base member 676 includes a plurality of elongated members 680. As shown in FIGS. 18 and 19, in one embodiment each first base member 674 and second base member 676 includes three elongated members 680. Thus, each there is a first set of elongated members 700 disposed on each first base member 674, and, a second set of elongated members 702 disposed on each second base member 676. The first and second sets of elongated members 700, 702 are further disposed in opposing pairs. That is, as used herein, "opposing pairs" of elongated members 680 means that two elongated members 680 are in the same general horizontal plane and extend from different base members 674, 676. Further, the first base member 674 and second base member 676 are spaced from each other. Further, the elongated members 680 in a set 700, 702 are aligned vertically. That is, each elongated member 680 has a proximal end 682 and a distal end 684. Each elongated member proximal end 682 is directly coupled to one of the first or second base member bodies 677. Further, each elongated member proximal end 682 is positioned on the first or second base member bodies 677 so that a vertical axis passes through each elongated member 680 that is coupled to that first or second base member bodies 677.

In this configuration, each gripping assembly 672 defines an elongated gripping space 710. The gripping space 710 has a generally vertical axis 712. That is, the gripping space 710 is defined by the vertically aligned first set of elongated members 700 disposed to one side of the vertical axis 712 and the vertically aligned second set of elongated members 702 disposed on the opposing side of the vertical axis 712. Alternatively stated, each gripping assembly 672 includes a number of pairs of opposed, resilient elongated members 680 that are disposed in opposition across a gripping space vertical axis 712.

The pairs of opposed, resilient elongated members 680 are horizontally separated by a distance snuggly corresponding to the horizontal cross-sectional area of can body 2. In this configuration, each gripping assembly 672 is sized to grip a can body 2. As used herein, "grip" means the bias created when the gripping space 710 is slightly smaller than the size of the can body 2 and the resilient elongated members 680 are flexed outwardly when the can body 2 is moved into the gripping space 710. "Grip" does not mean that the resilient elongated members 680 are flexed or otherwise biased inwardly in a manner similar to human fingers closing about an object.

As shown in FIGS. 18 and 19, the resilient elongated members 680 are individually structured to allow a can body 2 to move into the gripping space 710. The individual resilient elongated members 680 are substantially similar, with the resilient elongated members 680 disposed on the first and second base members 674, 676 being generally mirror images, so a single resilient elongated member 680 will be described. As noted above, each elongated member 680 has a proximal end 682 and a distal end 684. Further, each elongated member 680 has a generally rectangular cross-section including an inner side 686 and a lower side 688. Each elongated member inner side 686 is substantially concave and has a curvature substantially corresponding to the perimeter of a can body 2. Each elongated member lower side 688 includes an angled inner edge 689. That is, as used herein, the "inner edge" is an angled surface created by truncating the vertex of the elongated member inner side 686 and elongated member lower side 688.

The reorienting chute 750 is structured to reorient a can body 2 from a vertical orientation to a generally horizontal orientation. The reorienting chute 750 includes a vertical can body portion 752, an arcuate transition portion 754, and a horizontal can body portion 756. The terms "vertical can body portion" and "horizontal can body portion" relate to the orientation of the can body 2 in the identified portion. The vertical can body portion 752 is elongated and extends generally horizontally. The vertical can body portion 752 includes a top guide 760, a bottom guide 762, an inner guide 764, and an outer guide 766. The vertical can body portion guides 760, 762, 764, 766 define a passage 768 having a cross-sectional area shaped to correspond to a vertical cross-section of the can body 2. The proximal ends, i.e., the end closest to the ram assembly, of the vertical can body portion guides 760, 762, 764, 766 may be flared outwardly. The vertical can body portion 752 is disposed adjacent to the drive assembly support member path 620 and, more specifically, adjacent the drive assembly support member path first end 622. The vertical can body portion 752 is sufficiently close to the drive assembly support member path first end 622 that, when a gripping assembly 672 is at the drive assembly support member path first end 622, the resilient elongated members 680 extend into the vertical can body portion 752.

The vertical can body portion inner guide 764, which is disposed immediately adjacent the drive assembly support member path 620, includes a number of generally horizontally extending slots 770. The vertical can body portion inner guide slots 770 are sized to correspond to the resilient elongated members 680. Further, the vertical can body portion inner guide slots 770 are positioned to align with the resilient elongated members 680. Thus, as each first base member 674 and second base member 676 moves over the drive assembly support member path 620, the resilient elongated members 680 on each first base member 674 and second base member 676 move into, a vertical can body portion inner guide slot 770. Thus, at the proximal end of the vertical can body portion 752, the can body 2 being moved by a gripping assembly 672 is surrounded by the vertical can body portion 752 as well as the gripping assembly 672.

As the gripping assembly 672 moves over the drive assembly support member path first end 622, which is arcuate, the first base member 674 travels over the arcuate drive assembly support member path first end 622 and swings away from the vertical can body portion 752. During this motion, the resilient elongated members 680 on a first base member 674 swing, i.e., move over an arc, out of the vertical can body portion 752. Thus, as the gripping assembly 672 moves about the drive assembly support member path first end 622, the first set of elongated members 700 and the second set of elongated members 702 spread apart as the first base member 674 travels over the drive assembly support member path first end 622 prior to the second base member 676. This action releases the can body 2 from the gripping assembly 672.

As the second base member 676 continues to move over the drive assembly support member path 620, the second set of elongated members 702 push the can body toward the arcuate transition portion 754. As the can body moves through the arcuate transition portion 754, the can body is reoriented from a vertical orientation to a horizontal orientation. The can body 2 then moves into the horizontal can body portion 756. The can body may then be picked up by a conventional can track (not shown).

Thus, as noted above, the take-away assembly 18 is structured to lightly grip a can body 2 as the ram assembly 250 completes its forward stroke and to move the can body 2 away from the path of travel of the ram assembly 250 during the ram assembly return stroke. This process may be assisted by a take-away assembly control system 780, which is part of a vertical bodymaker control system 800, discussed below. Take-away assembly control system 780 includes a controller 782, a number of sensors 784, and a number of targets 786. As used herein, a "target" is an object structured to be detected by a sensor 784. A "target" may be, but is not limited to a ferromagnetic material, a pattern, and a signal producing device. For example, sensors 784 may be structured to detect when a ferromagnetic material is near. The controller 782 is in electronic communication with the take-away assembly motor 602 and the number of sensors 784. The controller 782 is structured to produce command signals. As noted above, the take-away assembly motor 602 may respond to such command signals, e.g., the take-away assembly motor 602 may move into the first configuration in response to one command signal and move into the second configuration in response to another command signal. The sensors 784, upon detecting a target 786, provide a signal to the controller 782 which then generates the command signal. In an alternative embodiment, the sensors 784 are in electronic communication with the take-away assembly motor 602 and the sensors 784 produce the command signal.

In an exemplary embodiment, each sensor 784 is structured to detect a target 786 and to provide a command signal in response to detecting a target 786. The drive assembly sensor 784 is disposed adjacent the drive assembly support member 604. Further, each gripping assembly 672 includes a target 786. As shown, a target 786 may be a ferromagnetic material, such as, but not limited to a nut, disposed on a fastener 692. Thus, each time a gripping assembly 672 moves adjacent the sensor 784, a command signal is generated and provided to the take-away assembly motor 602. The command signal is generated and provided to the take-away assembly motor 602. Another sensor (not shown, hereinafter the "lower sensor") may be disposed adjacent to an element of the operating mechanism 14, such as, but not limited to, a redraw cam 274. In this configuration, the element of the operating mechanism 14, such as, but not limited to, a redraw cam 274, is a "target." As the element of the operating mechanism 14 rotates or moves generally vertically, as described above, the lower sensor detects the element and provides a signal to the controller 782 or a command signal to the take-away assembly motor 602.

In this configuration, the controller 782 or the sensors 784 may control the take-away assembly motor 602. For example, if the take-away assembly motor 602 is in the actuated, first configuration, the drive assembly support member 604 is in motion along with the gripping assemblies 672. As a gripping assembly 672 moves into position over the ram path of travel, a sensor 784 detects a target 786 on a gripping assembly 672. That is, the sensor is positioned so as to detect a target 786 when a gripping assembly 672 moves into position over the ram path of travel. When this target 786 is detected, a command signal is provided to the take-away assembly motor 602 causing the take-away assembly motor 602 to move into the stationary, second configuration. Thus, the gripping assembly 672 is positioned over the ram path of travel. As described above, the ram assembly 250 moves a can body 2 into the space between the tool pack 16 and the domer 500, which is also where the gripping assembly 672 is positioned.

As the can body 2 is ejected from the ram assembly 250, as described above, the can body 2 is gripped by the gripping assembly 672. As the operating mechanism 14 rotates, the redraw cam 274 moves past the lower sensor and a command signal is provided to the take-away assembly motor 602 and the take-away assembly motor 602 returns to the actuated, first configuration causing the drive assembly support member 604 to move and transfer the can body 2 to the reorienting chute 750 as described above. That is, the lower sensor is positioned to detect the redraw cam 274 when the ram assembly 250 is not in the second extended position. This cycle then repeats with each gripping assembly 672 stopping over the ram path of travel and picking up a can body 2.

Put another way, when the ram assembly 250 is in the first position, the take-away assembly motor 602 is in the first configuration, and, when the ram assembly 250 is in the second position, the take-away assembly motor 602 is in the second configuration. Further, when the ram assembly 250 is in the second position, the gripping space vertical axis 712 is generally aligned with the ram assembly 250 longitudinal axis. In this configuration, the ram assembly 250 deposits a can body 2 in each gripping assembly 672 during a cycle.

Operation of the vertical bodymaker 10 may be directed by a vertical bodymaker control system 800, shown schematically in FIG. 2. The vertical bodymaker control system 800 includes a master control unit 802, a number of sensor assemblies (a motor sensor assembly 804 is shown schematically in FIG. 9), and a number of component control units 806. The various elements of the vertical bodymaker control system 800 are in electronic communication with each other via hard line or wireless communication systems (neither shown). The sensor assemblies 804 are disposed on various elements of the vertical bodymaker 10 and are structured to generate data related to the various components. The sensor assemblies 804 further generate a signal incorporating the data which is communicated to the master control unit 802. Such data is identified hereinafter as sensor data.

The master control unit 802, in one embodiment, includes a programmable logic controller (not shown) as well as a memory device (not shown). The memory device includes executable logic, such as, but not limited to, computer code. The executable logic is processed by the programmable logic controller. That is, the programmable logic controller receives sensor data that is processed according to the executable logic. Based on the sensor data, as well as other input such as but not limited to a timer, the executable logic generates control unit data. The control unit data is then communicated to the various component control units 806.

The component control units 806 are structured to control selected elements of the vertical bodymaker 10. For example, the take-away assembly control system 780 discussed above is one component control unit 806. Other component control units 806 include, but are not limited to, a cup feed assembly control unit, a motor control unit, and a pneumatic system control unit (none shown). Each component control unit 806 also includes a programmable logic controller (not shown) as well as a memory device (not shown). As described above, each component control unit 806 programmable logic controller processes executable logic or commands from the master control unit 802. It is understood that each component control unit 806 is in electronic communication with a component that is electronically controlled.

For example, the motor control unit is electronically coupled to and structured to control operating mechanism motor 152. A motor sensor assembly 804 (shown schematically in FIG. 9) includes a rotary timing device 810 (FIG. 9) such as, but not limited to, a resolver or encoder, that is structured to detect the position of the crankshaft 150. The motor sensor assembly 804 generates crankshaft position data that is communicated to the master control unit 802.

Further, the cup feed assembly control unit is electronically coupled to, and structured to control, the rotatable feeder disk assembly motor (not shown). The cup feed assembly control unit receives data from the master control unit 802 such as crankshaft position data. The cup feed assembly control unit processes the crankshaft position data to determine when to actuate the rotatable feeder disk assembly motor (not shown). In an alternate embodiment, a cup feed assembly sensor assembly (not shown) determines and provides feeder disk position data the master control unit 802. The master control unit 802 processes the crankshaft position data and the feeder disk position data and sends a command signal to the cup feed assembly control unit to actuate the rotatable feeder disk assembly motor at the proper time.

As a further example, the pneumatic system control unit is structured to control the pneumatic system (not shown). For example, the master control unit 802 processes the crankshaft position data and sends a command to the pneumatic system control unit actuating the pneumatic system to eject a can body 2 at the proper time as described above.

It is understood that the vertical bodymaker control system 800 is structured to ensure proper timing of the various components and the timing of the actions described above so that the actions occur at the proper time and to ensure the components do not interfere with each other.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A can body take-away assembly for a can bodymaker with a vertically oriented, reciprocating, elongated ram assembly and a domer, said ram assembly reciprocating over a generally vertical path and moving between a retracted, lower first position and an extended, upper second position, said ram assembly supporting a can body when in said second position, said take-away assembly comprising:
   a drive assembly including a motor and a support member;
   said take-away assembly motor operatively coupled to said support member and structured to move said drive assembly support member in a generally horizontal direction;
   a can body transport assembly including a number of gripping assemblies, each gripping assembly coupled to said drive assembly support member, each gripping assembly including a number of pairs of opposed gripping members sized to grip a can;
   said gripping assemblies structured to travel across the path of said ram assembly and to selectively grip a can body; and
   wherein said can body transport assembly includes a reorienting chute, said reorienting chute including a vertical can body portion, an arcuate transition portion, and a horizontal can body portion.

2. The can body take-away assembly of claim 1 wherein each said gripping assembly defines an elongated gripping space, said gripping space having a generally vertical axis.

3. The can body take-away assembly of claim 2 wherein said pairs of opposed elongated members are in opposition across a gripping space vertical axis.

4. The can body take-away assembly of claim 1 wherein:
   said gripping assembly includes a number of pairs of opposed, resilient elongated members; and
   wherein said pairs of opposed elongated members are horizontally separated by a distance snuggly corresponding to the horizontal cross-sectional area of can body.

5. The can body take-away assembly of claim 4 wherein:
   each said elongated member includes an inner side; and
   wherein each said elongated member inner side is substantially concave and has a curvature substantially corresponding to the perimeter of a can body.

6. The can body take-away assembly of claim 4 wherein:
   each said elongated member includes a lower side; and
   wherein each said elongated member lower side includes an angled inner edge.

7. The can body take-away assembly of claim 1 wherein:
   said gripping assembly includes a number of pairs of opposed, resilient elongated members, said pairs of elongated members including a first set of elongated members and a second set of elongated members;
   said first set of elongated members disposed on a first base member;
   said second set of elongated members disposed on a second base member;
   said first base member and said second base member each coupled to said support member, wherein said first base member and said second base member are spaced from each other;
   said support member traveling over a path that is a horizontal loop, said support member path having a first end and a second end;
   said support member path first end disposed adjacent said vertical can body portion;
   said gripping assembly elongated members extending into said vertical can body portion; and
   wherein, as said gripping assembly moves about said support member path first end, said first set of elongated members and said second set of elongated members spread apart as said first base member travels over said support member path first end prior to said second base member.

8. The can body take-away assembly of claim 7 wherein:
   said reorienting chute vertical can body portion includes a top guide, a bottom guide, and an inner guide;
   said inner guide including a number of slots; and
   wherein said gripping assembly elongated members move through said inner guide slots as said gripping assembly moves about said support member path second end.

9. The can body take-away assembly of claim 1 wherein:
   said gripping assembly includes a number of pairs of opposed, resilient elongated members, said pairs of elongated members including a first set of elongated members and a second set of elongated members;
   said first set of elongated members disposed on a first base member;
   said second set of elongated members disposed on a second base member;
   said first base member movably selectively coupled to said support member;
   said second base member fixed to said support member; and
   wherein said first base member is selectively positioned in one of a first position, wherein said first base member has a first spacing from said second base member or a second position, wherein said first base member has a second spacing from said second base member.

10. A can body take-away assembly for a can bodymaker with a vertically oriented, reciprocating, elongated ram assembly and a domer, said ram assembly reciprocating over a generally vertical path and moving between a retracted, lower first position and an extended, upper second position, said ram assembly supporting a can body when in said second position, said take-away assembly comprising:
   a drive assembly including a motor and a support member;
   said take-away assembly motor operatively coupled to said support member and structured to move said drive assembly support member in a generally horizontal direction;
   a can body transport assembly including a number of gripping assemblies, each gripping assembly coupled to said drive assembly support member, each gripping assembly including a number of pairs of opposed gripping members sized to grip a can;
   said gripping assemblies structured to travel across the path of said ram assembly and to selectively grip a can body;
   wherein said support member is a tension member;
   said drive assembly includes a tension member support;
   said tension member support includes a lower support element;
   said lower support element disposed below said tension member and defining a generally planar track; and said tension member traveling over said lower support element.

11. A can body take-away assembly for a can bodymaker with a vertically oriented, reciprocating, elongated ram assembly and a domer, said ram assembly reciprocating over a generally vertical path and moving between a retracted, lower first position and an extended, upper second position, said ram assembly supporting a can body when in said second position, said take-away assembly comprising:
- a drive assembly including a motor and a support member;
- said take-away assembly motor operatively coupled to said support member and structured to move said drive assembly support member in a generally horizontal direction;
- a can body transport assembly including a number of gripping assemblies, each gripping assembly coupled to said drive assembly support member, each gripping assembly including a number of pairs of opposed gripping members sized to grip a can;
- said gripping assemblies structured to travel across the path of said ram assembly and to selectively grip a can body;
- each said gripping assembly defines an elongated gripping space, said gripping space having a generally vertical axis;
- said take-away assembly motor is structured to provide an indexed motion to said support member, wherein said take-away assembly motor is in either actuated, first configuration, wherein said take-away assembly motor provides motion to said support member, or in a stationary, second configuration, wherein said take-away assembly motor does not provide motion to said support member;
- wherein, when said ram assembly is in said first position, said take-away assembly motor is in said first configuration, and, when said ram assembly is in said second position, said take-away assembly motor is in said second configuration; and
- wherein, when said ram assembly is in said second position, said gripping space vertical axis is generally aligned with said ram assembly longitudinal axis.

12. The can body take-away assembly of claim 11 wherein:
- said drive assembly includes a control system with a number of sensors structured to detect a target and to provide a command signal in response to detecting a target;
- each said control system sensor is disposed adjacent said support member;
- each said gripping assembly including a target; and
- said take-away assembly motor is structured to receive a command signal and, in response to receiving said command signal, said take-away assembly motor is structured to switch to said second configuration.

13. The can body take-away assembly of claim 10 wherein the tension member is a roller chain.

14. The can body take-away assembly of claim 10 wherein:
- said tension member includes a number of lower support blocks;
- said lower support blocks disposed on the lower side of said tension member;
- said lower support blocks including a track engagement surface; and
- said lower support blocks engagement surface movably coupled to said lower support element.

15. The can body take-away assembly of claim 14 wherein:
- said tension member support includes an upper support element;
- said upper support element disposed above said tension member and defining a generally planar track;
- said tension member includes a number of upper support blocks;
- said upper support blocks disposed on the upper side of said tension member;
- said upper support blocks including a track engagement surface; and
- said upper support blocks engagement surface movably coupled to said upper support element.

* * * * *